United States Patent
Park et al.

(10) Patent No.: US 11,886,973 B2
(45) Date of Patent: Jan. 30, 2024

(54) NEURAL PROCESSING UNIT INCLUDING VARIABLE INTERNAL MEMORY

(71) Applicant: DEEPX CO., LTD., Seongnam-si (KR)

(72) Inventors: JungBoo Park, Seoul (KR); InSu Park, Ansan-si (KR); Lokwon Kim, Seongnam-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 18/076,361

(22) Filed: Dec. 6, 2022

(65) Prior Publication Data
US 2023/0385602 A1  Nov. 30, 2023

(30) Foreign Application Priority Data

May 30, 2022  (KR) .................. 10-2022-0066219
Oct. 14, 2022  (KR) .................. 10-2022-0132180

(51) Int. Cl.
*G06N 3/04* (2023.01)
*G06F 3/06* (2006.01)
*G06F 13/28* (2006.01)

(52) U.S. Cl.
CPC ............ *G06N 3/04* (2013.01); *G06F 3/0625* (2013.01); *G06F 3/0629* (2013.01); *G06F 3/0673* (2013.01); *G06F 13/28* (2013.01); *G06F 2213/28* (2013.01)

(58) Field of Classification Search
CPC .......... G06N 3/045; G06N 3/063; G06N 3/02
See application file for complete search history.

(56) References Cited

U.S. PATENT DOCUMENTS

| | | | |
|---|---|---|---|
| 2018/0046894 A1 | 2/2018 | Yao | |
| 2019/0250860 A1* | 8/2019 | Tian | G06F 16/285 |
| 2019/0325298 A1* | 10/2019 | Chen | G06N 3/063 |
| 2020/0026977 A1* | 1/2020 | Lee | G06N 3/02 |
| 2020/0202200 A1* | 6/2020 | Son | G06N 3/045 |
| 2021/0019600 A1 | 1/2021 | Huang et al. | |

FOREIGN PATENT DOCUMENTS

| | | |
|---|---|---|
| JP | 2008-059054 A | 3/2008 |
| JP | 2020-515989 A | 5/2020 |
| KR | 10-2020-0028791 A | 3/2020 |
| KR | 10-2020-0053886 A | 5/2020 |
| KR | 10-2020-0139343 A | 12/2020 |
| KR | 10-2021-0072524 A | 6/2021 |
| KR | 10-2022-0025143 A | 3/2022 |
| KR | 10-2022-0046794 A | 4/2022 |
| KR | 10-2022-0059408 A | 5/2022 |

* cited by examiner

*Primary Examiner* — Getente A Yimer
(74) *Attorney, Agent, or Firm* — INVENSTONE PATENT, LLC

(57) ABSTRACT

A neural processing unit includes an internal memory including a plurality of memory units; a controller configured to control read and write operations of data in at least one of an input feature map domain, a weight domain, and an output feature map domain with respect to each of the plurality of memory units based on an operation schedule in a machine code in which a plurality of operation steps of an artificial neural network model are set.

18 Claims, 12 Drawing Sheets

NEURAL PROCESSING UNIT INCLUDING VARIABLE INTERNAL MEMORY

CROSS-REFERENCE TO RELATED APPLICATIONS

This application claims the priority of Korean Patent Application No. 10-2022-0066219 filed on May 30, 2022 and Korean Patent Application No. 10-2022-0132180 filed on Oct. 14, 2022 in the Korean Intellectual Property Office, the disclosures of which are incorporated herein by reference.

BACKGROUND OF THE DISCLOSURE

Technical Field

The present disclosure relates to a neural processing unit including a variable internal memory and an operation method thereof.

Background Art

Humans are eAI calculationuipped with intelligence that can perform recognition, classification, inference, prediction, and control/decision making. Artificial intelligence (AI) refers to artificially mimicking human intelligence.

The human brain is made up of a multitude nerve cells called neurons. Each neuron is connected to hundreds to thousands of other neurons through connections called synapses. In order to imitate human intelligence, the modeling of the operating principle of biological neurons and the connection relationship between neurons is called an artificial neural network (ANN) model. That is, an ANN is a system that connects nodes that mimic neurons in a layer structure.

SUMMARY OF THE DISCLOSURE

ANN models are divided into "single-layer neural network" and "multi-layer neural network" according to the number of layers. A general multi-layer neural network consists of an input layer, a hidden layer, and an output layer. The input layer is a layer that receives external data. The hidden layer is located between the input layer and the output layer, receives a signal from the input layer, extracts characteristics, and transmits it to the output layer. The output layer receives a signal from the hidden layer and outputs it to the outside.

There are several types of deep neural networks (DNNs) that increase the number of hidden layers to implement higher artificial intelligence in multi-layer neural networks. On the other hand, it is known that a convolutional neural network (CNN) makes it easy to extract features of input data and to identify patterns of the extracted features.

In the CNN-based artificial neural network model, convolution operation, activation function operation, pooling operation, stride operation, batch-normalization operation, skip-connection operation, concatenation operation, AI calculationuantization operation, clipping operation, padding operation, and the like can be selected and processed according to the architecture of the artificial neural network.

The structure of the artificial neural network model may be designed to include a plurality of layers. Each layer of the artificial neural network model may be designed to process at least some of convolution operation, activation function operation, pooling operation, stride operation, batch-normalization operation, skip-connection operation, concatenation operation, AI calculationuantization operation, clipping operation, and padding operation.

Some of the respective layers of the artificial neural network model may be connected in series with each other. Some of the respective layers of the artificial neural network model may be branched in parallel with each other. Some of the respective layers of the artificial neural network model may be connected in parallel with each other.

For example, in each layer of a convolutional neural network (CNN), an input feature map corresponding to input data and a kernel corresponding to weight may be a matrix composed of a plurality of channels. The convolution operation is performed with the input feature map and the kernel, the output feature map is generated in each channel by the convolution operation, and the activation map of the corresponding channel is generated by applying the activation function to the output feature map. Thereafter, pooling for the activation map may be applied. Here, the activation map may be generically referred to as an output feature map.

The inventors of the present disclosure have studied a neural processing unit (NPU), which is a processor of an artificial neural network memory system optimized for the aforementioned artificial neural network model processing.

The neural processing unit (NPU) may be configured to include each processing circuit optimized for convolution operation, activation function operation, pooling operation, stride operation, batch-normalization operation, skip-connection operation, concatenation operation, AI calculationuantization operation, clipping operation, and padding operation reAI calculationuired for the above-described artificial neural network operations.

The inventors of the present disclosure more specifically studied a memory system of a neural processing unit (NPU) optimized for processing a convolutional neural network (CNN) model.

The neural processing unit (NPU) includes a processing element for performing a convolution operation and a memory for storing data necessary for the convolution operation. The memory of the neural processing unit (NPU) may need to store an input feature map, a weight, and an output feature map.

On the other hand, hardware for implementing the neural processing unit (NPU) may be an AI-dedicated application specific integrated circuit (ASIC). The inventors of the present disclosure have recognized that an area in which a memory is formed may be limited in order to secure an area forming processing elements in an AI-dedicated ASIC.

In particular, the inventors of the present disclosure recognized that the mass production yield of an AI-dedicated ASIC mass-produced in a 3 nm to 28 nm process through a foundry company may decrease in proportion to the memory capacity of the AI-dedicated ASIC. Accordingly, the inventors of the present disclosure have recognized that, by reducing the memory capacity of the neural processing unit, the production cost of the AI-dedicated ASIC can be reduced and the productivity of the AI-dedicated ASIC can be improved.

However, as the memory capacity of the AI-dedicated ASIC decreases, the space to store the feature map and weights in the dedicated ASIC becomes insufficient. Accordingly, the inventors of the present disclosure have recognized that the feature map and the weight should be stored in the main memory and tiled at a more freAI calculationuent freAI calculationuency.

In addition, the inventors of the present disclosure recognized that, as the amount of data transmission between the AI-dedicated ASIC and the main memory increases, the power reAI calculationuired of the system increases rapidly.

In addition, the inventors of the present disclosure have recognized that, when the memory of the AI-dedicated ASIC has a conventional single domain, the memory of the AI-dedicated ASIC cannot efficiently provide feature maps and weights to the processing elements.

In detail, the conventional single domain memory should provide weight data to a processing element for one clock cycle and seAI calculationuentially provide input feature map data for the next clock cycle. After the next clock cycle, the conventional single domain memory should receive an output feature map data for one clock cycle from the processing element. That is, according to the memory structure, the processing element needs three clock cycles to process one multiply-accumulate (MAC) operation. Accordingly, the inventors of the present disclosure have recognized that the conventional single domain memory may be inefficient for artificial neural network computation in terms of processing speed.

Accordingly, the inventors of the present disclosure have implemented a multi-domain memory for simultaneously providing a feature map and a weight. That is, the inventors of the present disclosure implemented the memory of the AI-dedicated ASIC to have a feature map domain and a weight domain. Accordingly, the inventors of the present disclosure recognized that the processing element may receive one feature map and one weight for one clock cycle in the memory of each domain. That is, due to the memory structure, the processing element can process one MAC operation per one clock cycle. Accordingly, the inventors of the present disclosure recognized that the multi-domain memory can be efficient for artificial neural network computation in terms of processing speed.

However, the inventors of the present disclosure have recognized that, when an independent feature map memory and weight memory are implemented in the memory of the ASIC dedicated for artificial intelligence, the memory capacity of each domain is fixed.

On the other hand, when the structure of the artificial neural network model is analyzed, each layer of the artificial neural network model has a feature map of a different size and a weight of a different size. In this case, the inventors of the present disclosure have recognized that data of a specific domain may not be stored in a memory of another domain. That is, according to the structure of the artificial neural network model, the inventors of the present disclosure recognized that the utilization rate (%) of the multi-domain memory of the AI-dedicated ASIC can be significantly reduced. For example, referring to the case of the artificial neural network model illustrated in FIG. 8, the inventors of the present disclosure have recognized that the data size of the feature map and the weight may vary considerably for each layer. In particular, in the case of the first layer of FIG. 8, since the data size of the weight is significantly smaller than that of the feature map, the inventors of the present disclosure have recognized that the memory of the weight domain may be unused. Meanwhile, in the case of the first layer of FIG. 8, since the data size of the feature map is relatively large compared to the weight, the inventors of the present disclosure have recognized that the memory of the feature map domain may be substantially insufficient.

Accordingly, the inventors of the present disclosure recognized that effectively controlling the memory of the multi-domain during the computation of the artificial neural network model is the key to improving the neural network computation processing speed.

That is, when the neural processing unit (NPU) cannot properly control the memory of the multi-domain when processing the artificial neural network model, necessary data may not be cached in advance. In this case, the inventors of the present disclosure have recognized that a reduction in the effective memory bandwidth of a neural processing unit (NPU) and/or a delay in data provision of the memory may occur freAI calculationuently. In addition, in such case, the inventors of the present disclosure recognized that the neural processing unit (NPU) is in a starvation or idle state that does not receive data to be processed, and thus cannot perform actual calculations, thereby reducing the calculation performance.

Furthermore, by analyzing the structure of the artificial neural network model, data necessary for the neural processing unit (NPU) can be prefetched. Accordingly, the inventors of the present disclosure have recognized that the neural processing unit (NPU) can reduce starvation or idle state in which data to be processed cannot be supplied.

An object of the present disclosure is to provide a neural processing unit capable of variably controlling an internal memory based on a data domain of an artificial neural network model, and a method of operating the same.

Another object of the present disclosure is to provide a neural processing unit capable of optimizing the capacity of a memory in the neural processing unit, and a method of operating the same.

Another object of the present disclosure is to provide a neural processing unit capable of variably controlling an internal memory and its capacity allocation based on a data domain for each layer of an artificial neural network model, and a method of operating the same.

Another object of the present disclosure is to provide a neural processing unit capable of scheduling capacity setting of each domain of an internal memory based on an operation order and data domain of an artificial neural network model, and a method of operating the same.

Another object of the present disclosure is to provide a neural processing unit capable of variably controlling an internal memory so that a data transfer amount of the main memory can be reduced, and a method of operating the same.

Another object of the present disclosure is to provide a method of analyzing the structure of the artificial neural network model to be processed by the neural processing unit (NPU), controlling the memory units of the variable memory, and controlling the memory units of the variable memory to reuse the output feature map of the previous layer as the input feature map of the next layer, thereby improving the computation speed of the artificial neural network model.

However, the objects of the present disclosure are not limited to the above-mentioned problems, and other objects not mentioned will be clearly understood by those skilled in the art from the following description.

According to the examples of the present disclosure, a neural processing unit may include an internal memory including a plurality of memory units; and a controller configured to control read and write operations of data of at least one of an input feature map domain, a weight domain, and an output feature map domain with respect to each of the plurality of memory units based on an operation schedule in a machine code in which a plurality of operation steps of an artificial neural network model are set.

According to the examples of the present disclosure, the machine code may include information on input feature map data, weight data, and output feature map data for the plurality of operation steps.

According to the examples of the present disclosure, the machine code may include capacity information on input feature map data, capacity information on weight data, and capacity information on output feature map data for each of the plurality of operation steps of the artificial neural network model.

According to the examples of the present disclosure, the machine code may include information on an operation step having the same data locality among the plurality of operation steps of the artificial neural network model.

According to the examples of the present disclosure, the machine code may include operation order information of each of the plurality of operation steps of the artificial neural network model based on an artificial neural network data locality.

According to the examples of the present disclosure, the neural processing unit may further include a direct memory access (DMA) configured to read data from a main memory and to write input feature map data and weight data to the internal memory; and an artificial intelligence (AI) calculation unit configured to receive and operate the input feature map data and the weight data from the internal memory to generate output feature map data.

According to the examples of the present disclosure, the neural processing unit may further include at least one processing element configured to perform a convolution operation of input feature map data and weight data to generate output feature map data.

According to the examples of the present disclosure, the neural processing unit may further include first to third selectors configured to select each of the plurality of memory units based on the machine code; and a processing element including a first input unit configured to receive input feature map data through the first selector, a second input unit configured to receive weight data through the second selector, and output unit configured to output output feature map data through the third selector.

According to the examples of the present disclosure, the internal memory may further include a weight multiplexer, an input feature map multiplexer, and an output feature map demultiplexer, respectively connected to each of the plurality of memory units.

According to the examples of the present disclosure, a neural processing unit may include an internal memory including a plurality of memory units configured to store data of a first domain, a second domain, and a third domain, the plurality of memory units including a first memory unit storing the data of the first domain, a second memory unit storing the data of the second domain, and a third memory unit storing the data of the third domain; an AI calculation unit including a first input unit configured to receive the data of the first domain, a second input unit configured to receive the data of the second domain, and an output unit configured to output the data of the third domain; a first selector configured to connect the first memory unit to the first input unit; a second selector configured to connect the second memory unit to the second input unit; and a third selector configured to connect the third memory unit to the output unit.

According to the examples of the present disclosure, the neural processing unit may further include a controller configured to control the first to third selectors by a machine code that analyzes data locality of an artificial neural network model.

According to the examples of the present disclosure, the first selector may be configured to input at least a portion of the data of the first domain to the AI calculation unit according to an operation order defined in the machine code. The second selector may be configured to input at least a portion of the data of the second domain to the AI calculation unit according to the operation order defined in the machine code. The third selector may be configured to output at least a portion of the data of the third domain to at least one of the plurality of memory units according to the operation order defined in the machine code.

According to the examples of the present disclosure, each of the plurality of memory units may be configured to have a predetermined memory capacity that is the same for each of the plurality of memory units or that is individually set for each of the plurality of memory units.

According to the examples of the present disclosure, the neural processing unit may further include a controller configured to execute a machine code configured to set the first to third domains in each of the plurality of memory units for each operation step of a plurality of operation steps of an artificial neural network model, each of the first to third domains set in consideration of a memory capacity of one of the plurality of memory units.

According to the examples of the present disclosure, the neural processing unit may further include a controller configured to control the internal memory. The controller may be further configured to reset the data of the third domain to the data of the first domain in a next operation step based on the machine code analyzing the data locality of the artificial neural network model as the same data locality.

According to the examples of the present disclosure, the neural processing unit may further include a controller configured to respectively control the first to third selectors for each operation step of a plurality of operation steps so that an output feature map having the same data locality as an input feature map is reused in a next operation step of the plurality of operation steps. The first domain may be an input feature map, the second domain may be a weight, and the third domain may be an output feature map.

According to the examples of the present disclosure, the plurality of memory units may include a first memory group of memory units configured as the first domain, a second memory group of memory units configured as the second domain, and a third memory group of memory units configured as the third domain.

According to the examples of the present disclosure, the internal memory may further include a prefetch memory configured to store data freAI calculationuently reAI calculationuired for calculation of an artificial neural network model. The stored data may include at least one of a fixed weight, an input feature map, and an output feature map.

According to the examples of the present disclosure, a system may include a main memory configured to store at least a portion of data of at least one artificial neural network model; and a neural processing unit. The neural processing unit may include a variable memory including a plurality of memory units, the variable memory configured to divide the portion of the data of the at least one artificial neural network model into a feature map and a weight and to selectively store the feature map and the weight in a specific unit of the plurality of memory units; a direct memory access (DMA) circuit configured to control a memory operation between the main memory and the variable memory; and an AI calculation unit configured to receive the feature map and the weight from the variable memory and to process an artificial neural network inference operation.

According to the examples of the present disclosure, the neural processing unit may be configured to execute a machine code compiled to reduce redundant data communication of the feature map between the main memory and the variable memory based on at least one same data locality information of the at least one artificial neural network model.

According to the examples of the present disclosure, the plurality of memory units may include a first memory unit, a second memory unit, and a third memory unit. The variable memory may be further configured to store data of a first domain in the first memory unit, to store data of a second domain in the second memory unit, and to store data of a third domain in the third memory unit. The neural processing unit may further include a controller configured to adjust a size of each domain of the variable memory based on a total capacity of the variable memory and structural data of the at least one artificial neural network model.

According to the examples of the present disclosure, the variable memory may be further configured to reuse the feature map by applying a machine code in which the at least one artificial neural network model is compiled, thereby reducing at least one of a power consumption of the system and an inference operation processing time of the system.

The details of the examples are included in the detailed description and drawings.

According to the present disclosure, the processing speed of the neural processing unit can be improved by simultaneously providing the weight and feature map data reAl calculationuired for the artificial neural network operation from the internal memory of the multi-domain to the processing element.

According to the present disclosure, since the internal memory of the neural processing unit has an adjustable data domain, it is possible to optimize the utilization rate (%) of the internal memory.

According to the present disclosure, since the internal memory of the neural processing unit has an adjustable data domain size, it is possible to optimize the internal memory utilization rate (%) during calculation for each layer of the artificial neural network model.

According to the present disclosure, by variably controlling data stored in the internal memory, it is possible not only to improve the memory utilization rate (%), but also to avoid storing unnecessary data that is not used for operation in one layer.

In addition, according to the present disclosure, it is possible to achieve maximum storage efficiency with a minimum memory size, thereby providing better caching performance.

In addition, since there is no need to inefficiently increase the memory size in the neural processing unit including the internal memory of the present disclosure, the manufacturing yield of the ASIC chip may be increased.

In addition, by optimizing the size of the internal memory in the present disclosure, there is an effect that the power consumption of the neural processing unit can also be reduced.

In addition, according to the present disclosure, it is possible to reduce power consumption of the system by variably controlling the internal memory so that the data transmission amount between the neural processing unit and the main memory can be reduced.

In addition, according to the present disclosure, the performance of the neural processing unit can be improved by scheduling the capacity setting of each domain of the internal memory based on the operation order and data domain of the artificial neural network model.

In addition, according to the present disclosure, the neural processing unit may control the memory units of the variable memory to reuse the output feature map of the previous layer as the input feature map of the next layer. Accordingly, the amount of data communication between the main memory and the variable memory can be reduced, and the operation speed of the neural processing unit can be improved.

Effects according to the disclosure are not limited by those exemplified above, and more various effects are included in the present disclosure.

DETAILED DESCRIPTION OF THE EMBODIMENT

Figure 1:
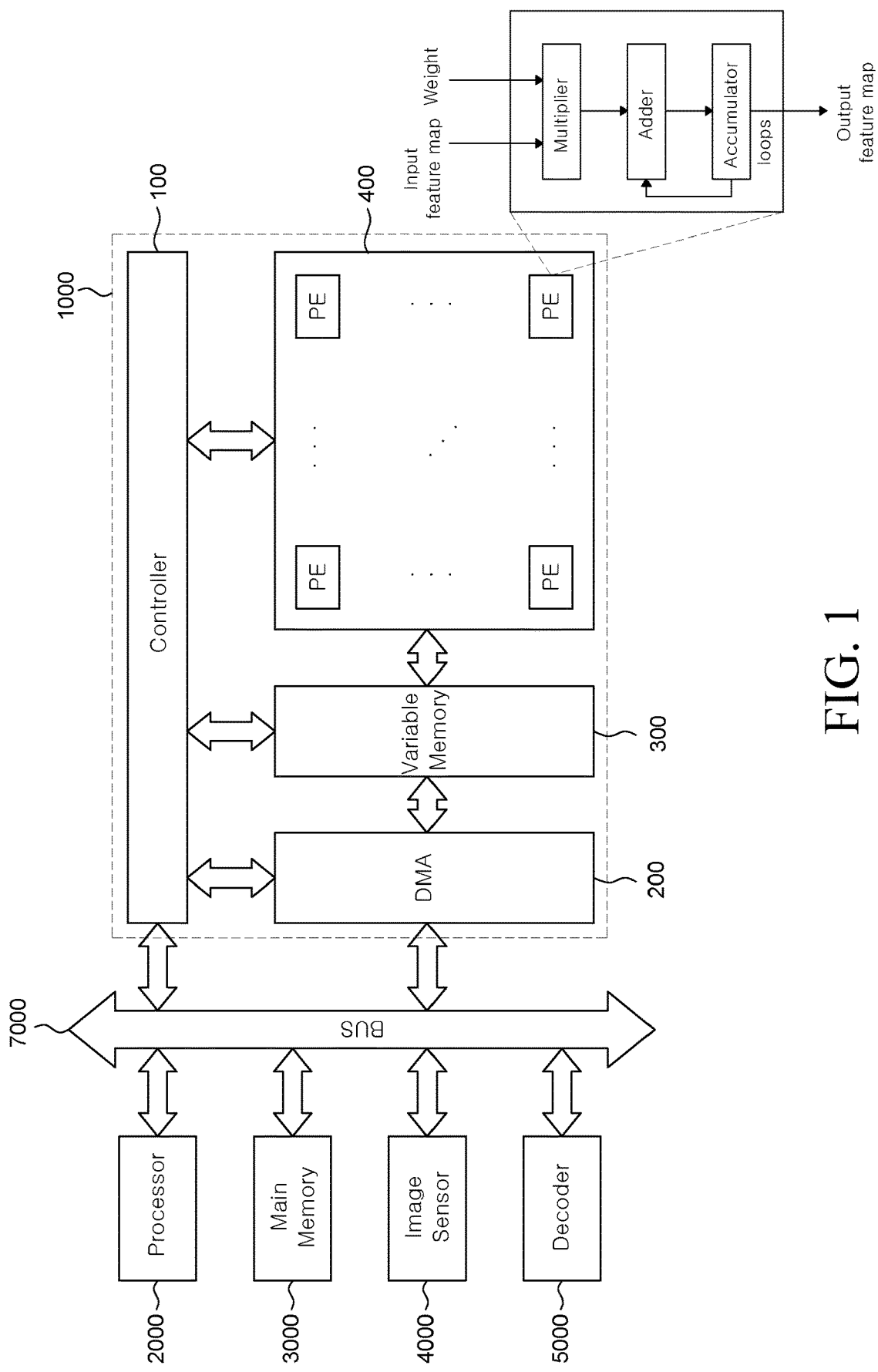
FIG. 1 is a schematic conceptual diagram illustrating a neural processing unit including a variable internal memory is a system according to an example of the present disclosure.

Particular structural or step-by-step descriptions for examples according to the concept of the present disclosure disclosed in the present specification or application are merely exemplified for the purpose of explaining the examples according to the concept of the present disclosure.

Examples according to the concept of the present disclosure may be embodied in various forms, and should not be construed as being limited to the examples described in the present specification or application.

Since the examples according to the concept of the present disclosure may have various modifications and may have various forms, specific examples will be illustrated in the drawings and described in detail in the present specification or application. However, this is not intended to limit the examples according to the concept of the present disclosure with respect to the specific disclosure form, and should be understood to include all modifications, eAI calculationuivalents, and substitutes included in the spirit and scope of the present disclosure.

Terms such as first and/or second may be used to describe various elements, but the elements should not be limited by the terms.

The above terms are only for the purpose of distinguishing one element from another element, for example, without departing from the scope according to the concept of the present disclosure, and a first element may be termed a second element, and similarly, a second element may also be termed a first element.

When an element is referred to as being "connected" or "in contact with" to another element, it is understood that the other element may be directly connected to or in contact with the other element, but other elements may be disposed therebetween. On the other hand, when it is mentioned that a certain element is "directly connected" or "directly connected" to another element, it should be understood that no other element is present therebetween.

Other expressions describing the relationship between elements, such as "between" and "immediately between" or "adjacent to" and "directly adjacent to," etc., should be interpreted similarly.

In this present disclosure, expressions such as "A or B," "at least one of A or/and B" or "one or more of A or/and B" may include all possible combinations thereof. For example, "A or B," "at least one of A and B," or "at least one of A or B" may refer to (1) including at least one A, (2) including at least one B, or (3) including both at least one A and at least one B.

As used herein, expressions such as "first," "second," "first or second" may modify various elements, regardless of order and/or importance. In addition, it is used only to distinguish one element from other elements, and does not limit the elements. For example, the first user apparatus and the second user apparatus may represent different user apparatus regardless of order or importance. For example, without departing from the scope of rights described in this disclosure, the first element may be named as the second element, and similarly, the second element may also be renamed as the first element.

Terms used in present disclosure are only used to describe specific examples, and may not be intended to limit the scope of other examples.

The singular expression may include the plural expression unless the context clearly dictates otherwise. Terms used herein, including technical or scientific terms, may have the same meanings as commonly understood by one of ordinary skill in the art described in this document.

Among terms used in present disclosure, terms defined in a general dictionary may be interpreted as having the same or similar meaning as the meaning in the context of the related art. Also, unless explicitly defined in this document, it should not be construed in an ideal or overly formal sense.

In some cases, even terms defined in the present disclosure cannot be construed to exclude examples of the present disclosure.

The terms used herein are used only to describe specific examples, and are not intended to limit the present disclosure.

The singular expression may include the plural expression unless the context clearly dictates otherwise. It should be understood that as used herein, terms such as "comprise" or "have" are intended to designate that the stated feature, number, step, action, component, part, or combination thereof exists, but it does not preclude the possibility of addition or existence of at least one other features or numbers, steps, operations, elements, parts, or combinations thereof.

Unless defined otherwise, all terms used herein, including technical or scientific terms, have the same meaning as commonly understood by one of ordinary skill in the art to which this disclosure pertains. Terms such as those defined in a commonly used dictionary should be interpreted as having a meaning consistent with the meaning in the context of the related art, and should not be interpreted in an ideal or excessively formal meaning unless explicitly defined in the present specification.

Each of the features of the various examples of the present disclosure may be partially or wholly combined or combined with each other. In addition, as those skilled in the art can fully understand, technically various interlocking and driving are possible, and each example may be implemented independently of each other or may be implemented together in a related relationship.

In describing the examples, descriptions of technical contents that are well known in the technical field to which the present disclosure pertains and are not directly related to the present disclosure may be omitted. This is to more clearly convey the gist of the present disclosure without obscuring the gist of the present disclosure by omitting unnecessary description.

Hereinafter, an example of the present disclosure will be described in detail with reference to the accompanying drawings.

FIG. 1 illustrates a neural processing unit including a variable internal memory according to an example of the present disclosure.

More specifically, FIG. 1 illustrates a neural processing unit including a variable memory, as well as a plurality of peripheral devices for operation of the neural processing unit. Accordingly, the neural processing unit and the plurality of peripheral devices may be referred to as a system. Some components of the system may be configured as a system on a chip (SoC).

Referring to FIG. 1, the neural processing unit (NPU) 1000 may be configured to communicate with a processor 2000, a main memory 3000, an image sensor 4000, and a decoder 5000 to perform various artificial neural network inference functions.

The neural processing unit 1000, the processor 2000, the main memory 3000, the image sensor 4000, and the decoder 5000 may be formed as independent circuits, but the present disclosure is not limited thereto. Each of the above-described components may be divided by their operating functions, and each component may be implemented with a circuit board, a silicon substrate, resistors and transistors, or the like.

Each of the above-described processor 2000, main memory 3000, image sensor 4000, and decoder 5000 may communicate with a neural processing unit 1000 so as to exchange data through a bus 7000. However, the present disclosure is not limited thereto, and the neural processing unit 1000 may be configured to be directly connected to at least one of the above-described components.

The neural processing unit 1000 may be a processor specialized for the operation of the artificial neural network model. In particular, the neural processing unit 1000 may be specialized for a convolution operation that occupies most of the amount of computation in the artificial neural network model.

The neural processing unit 1000 may include a controller 100, a direct memory access (DMA) 200, a variable memory 300, and at least one processing element 400.

The controller 100 may be configured to control an operation related to the operation of the DMA 200, the variable memory 300, and the plurality of processing elements 400, respectively, of the artificial neural network model. The controller 100 may be directly or indirectly connected to each of the DMA 200, the variable memory 300, and the plurality of processing elements 400 to communicate with each other. The controller 100 may adjust the capacity of each domain of the variable memory 300 based on the capacity of the variable memory 300 and the structural data of the artificial neural network model. Here, the variable memory 300 may be referred to as a cache memory or an internal memory. Also, the plurality of processing elements 400 or the processing element (PE) may be referred to as an artificial intelligence (AI) operation unit.

The DMA 200 may be configured such that the neural processing unit 1000 directly accesses the main memory 3000 of the neural processing unit 1000 and control read/write operations. The neural processing unit 1000 may read various data related to the artificial neural network model from the main memory 3000 through the DMA 200. The main memory 3000 may be embedded in a system-on-chip (SoC) or configured as a separate memory device.

The variable memory 300 may be a memory disposed in the on-chip region of the neural processing unit 1000 and may be an internal memory for caching or storing data processed in the on-chip region. The variable memory 300 may read and store at least some data reAI calculationuired for the computation of an artificial neural network model from the main memory 3000. The variable memory 300 may be configured to store all or part of the artificial neural network model according to the memory capacity setting of each domain and the data size for each layer of the artificial neural network model.

Specifically, the variable memory 300 may store the input feature map corresponding to the input data from the main memory 3000 and the kernel corresponding to the weight for the convolution operation with the input feature map. Also, the variable memory 300 may store an output feature map that is a result of performing a convolution operation of an input feature map and a weight from the plurality of processing elements 400.

Meanwhile, the variable memory 300 may include a memory such as ROM, SRAM, DRAM, resistive RAM, magneto-resistive RAM, phase-change RAM, ferroelectric RAM, flash memory, or HBM. In some cases, SRAM may be advantageous in terms of arithmetic processing speed. In addition, the variable memory 300 may be configured of at least one memory unit. The variable memory 300 may be configured as a homogeneous memory unit or a heterogeneous memory unit. That is, each memory unit of the variable memory 300 may store any one of an input feature map, a weight, and an output feature map.

Further, the data stored in the memory unit of the variable memory 300 is not fixed to any one of the input feature map, the weight, and the output feature map, but can be changed to another one of the input feature map, the weight and the output feature map as needed. That is, by varying the memory allocation of the variable memory 300, the utilization efficiency of the variable memory 300 may be improved.

The plurality of processing elements 400 may be configured to perform a multiplication and accumulation (MAC) operation. However, the present disclosure is not limited thereto, and the plurality of processing elements 400 according to various examples of the present disclosure may be modified and implemented as at least one processing element (PE).

The plurality of processing elements 400 are configured to calculate an input feature map corresponding to input data of the artificial neural network and a kernel corresponding to a weight. The processing element (PE) may include a multiply and accumulate (MAC) operator, an arithmetic logic unit (ALU) operator, and the like.

Referring to FIG. 1, the processing element (PE) may be configured to include a first input unit (i.e., input feature map), a second input unit (i.e., weight), an output unit (i.e., output feature map), a multiplier, an adder, and an accumulator.

The processing element (PE) may be configured to perform functions such as addition, multiplication, and accumulation necessary for processing an artificial neural network model. The accumulator accumulates the operation value of the multiplier and the operation value of the accumulator by using the adder as many times as the number of loops. The accumulator may be configured to receive an initialization signal and initialize data stored in the accumulator when the accumulation is completed.

For example, a first input unit (i.e., input feature map) of the processing element (PE) may be configured to receive an input feature map. A second input unit (i.e., weight) of the processing element (PE) may be configured to receive a weight. An output unit (i.e., output feature map) of the processing element (PE) may be configured to output an output feature map obtained by convolution of a weight and an input feature map.

According to an example of the present disclosure, the first input unit and the second input unit of the processing element (PE) may be configured to receive data AI calculationuantized as an 8-bit integer. However, the present invention is not limited thereto, and the first input unit and the second input unit may be configured to receive data AI calculationuantized as an integer of less than 8 bits. Accordingly, the AI calculationuantized data has an effect of reducing power consumption of the processing element (PE).

A first input unit (i.e., input feature map) of the processing element (PE) may be connected to communicate with the variable memory 300. A second input unit (i.e., weight) of the processing element (PE) may be connected to communicate with the variable memory 300. An output unit (i.e., output feature map) of the processing element (PE) may be connected to communicate with the variable memory 300.

In more detail, the output feature map according to the examples of the present disclosure should be interpreted in a comprehensive sense. For example, the output feature map may be a result of convolution.

However, the examples of the present disclosure are not limited thereto, and the output feature map may include cases where algorithms such as activation function operation, pooling operation, stride operation, batch-normalization operation, skip-connection operation, concatenation operation, AI calculationuantization operation, clipping operation, and padding operation are selectively applied to the convolution result.

For each optional algorithmic processing, the processing element (PE) may further include additional processing circuitry, or an output of the processing element (PE) may be configured to be coupled with the additional processing circuitry. Here, the output of the additional processing circuit may be referred to as an output feature map of the processing element (PE). In more detail, the processing element (PE) including the additional circuit unit may be referred to as an AI operation unit.

For example, a first input unit (i.e., input feature map) of the processing element (PE) may be configured to communicate with a first domain of the variable memory 300.

For example, a second input unit (i.e., weight) of the processing element (PE) may be configured to communicate with a second domain of the variable memory 300.

For example, an output unit (i.e., output feature map) of the processing element (PE) may be configured to communicate with the third domain of the variable memory 300.

As another example, a first input unit (i.e., input feature map) of the processing element (PE) may be configured to communicate with a feature map domain of the variable memory 300.

As another example, a second input unit (i.e., weight) of the processing element (PE) may be configured to communicate with a weight domain of the variable memory 300.

For another example, an output unit (i.e., output feature map) of the processing element (PE) may be configured to communicate with a feature map domain of the variable memory 300.

Here, each domain of the variable memory 300 may be configured to independently communicate with the processing element (PE).

However, examples according to the present disclosure are not limited thereto, and the processing element (PE) may be modified in consideration of the computational characteristics of the artificial neural network model. For example, the processing element (PE) is not limited to the MAC operator structure processed by the multiplier, adder, and accumulator shown in FIG. 1, and may be implemented as an arithmetic logic unit (ALU) operator, or a vector calculation unit.

The controller 100 may recognize an area, a location, an address, or the like in which the output feature map is stored in the variable memory 300. Accordingly, the controller 100 may control the variable memory 300 so that the output feature map stored in the variable memory 300 can be reused as the input feature map in the operation of the next layer. That is, for each operation step, the reusable feature map can be analyzed and reused in the next operation step.

In more detail, the controller 100 may convert data stored in the output feature map domain into an input feature map domain to be used for the next layer operation based on the structure of the artificial neural network model.

The main memory 3000 may store data necessary for calculation of the artificial neural network model.

The main memory 3000 may include a memory such as ROM, SRAM, DRAM, resistive RAM, magneto-resistive RAM, phase-change RAM, ferroelectric RAM, flash memory, or HBM. In addition, the DRAM is advantageous in terms of data storage capacity. The main memory 3000 may include at least one memory unit. The main memory 3000 may be configured as a homogeneous memory unit or a heterogeneous memory unit.

The main memory 3000 may store at least one artificial neural network model. The main memory 3000 may receive weights of at least a portion of at least one layer of the artificial neural network model to be processed by the neural processing unit 1000. The neural processing unit 1000 may be configured to alternately process different artificial neural network models.

The artificial neural network model processed by the neural processing unit 1000 may be a deep neural network model. Accordingly, the artificial neural network model may include a plurality of layers, and each layer may include each feature map and each weight.

The image sensor 4000 may generate an image or image data from light entering through a lens, and the generated image or image data may be used as an input feature map of an artificial neural network model. The image sensor 4000 may be at least one image sensor and, for example in the case of an autonomous vehicle, may be configured to include a plurality of image sensors.

The decoder 5000 may decode a feature map or weight of the encoded bit-stream, and the decoded input feature map or weight may be used as an input of an artificial neural network model. Here, the bit-stream may be a bit-stream corresponding to the MPEG standard. The MPEG standard may be, for example, video coding for machine (MPEG-VCM) or neural network compression (MPEG-NNC).

Figure 2:
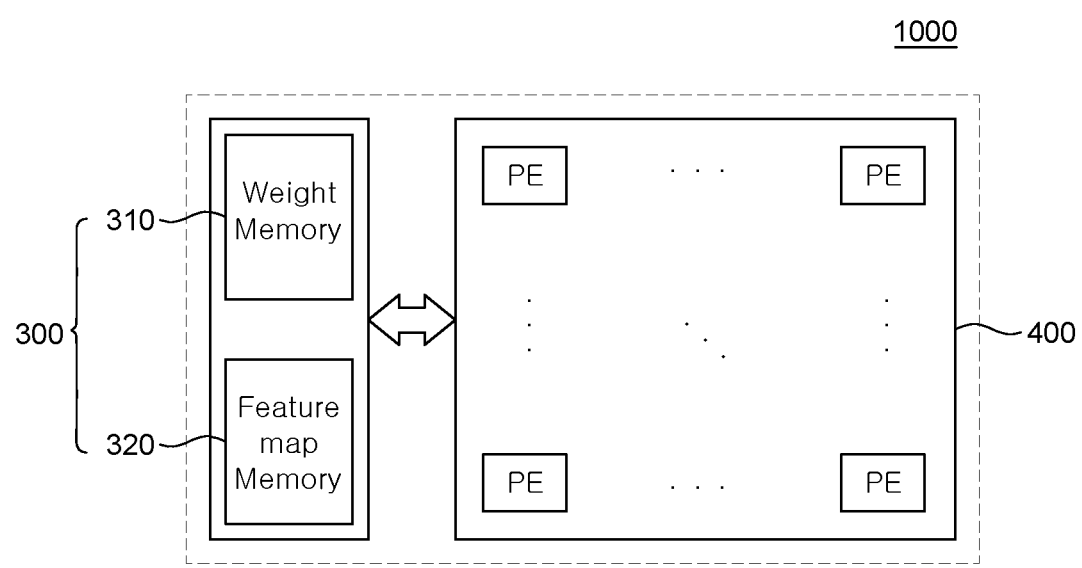
FIG. 2 is a diagram illustrating a weight memory and a feature map memory of a neural processing unit including a variable memory according to an example of the present disclosure.
Figure 3:
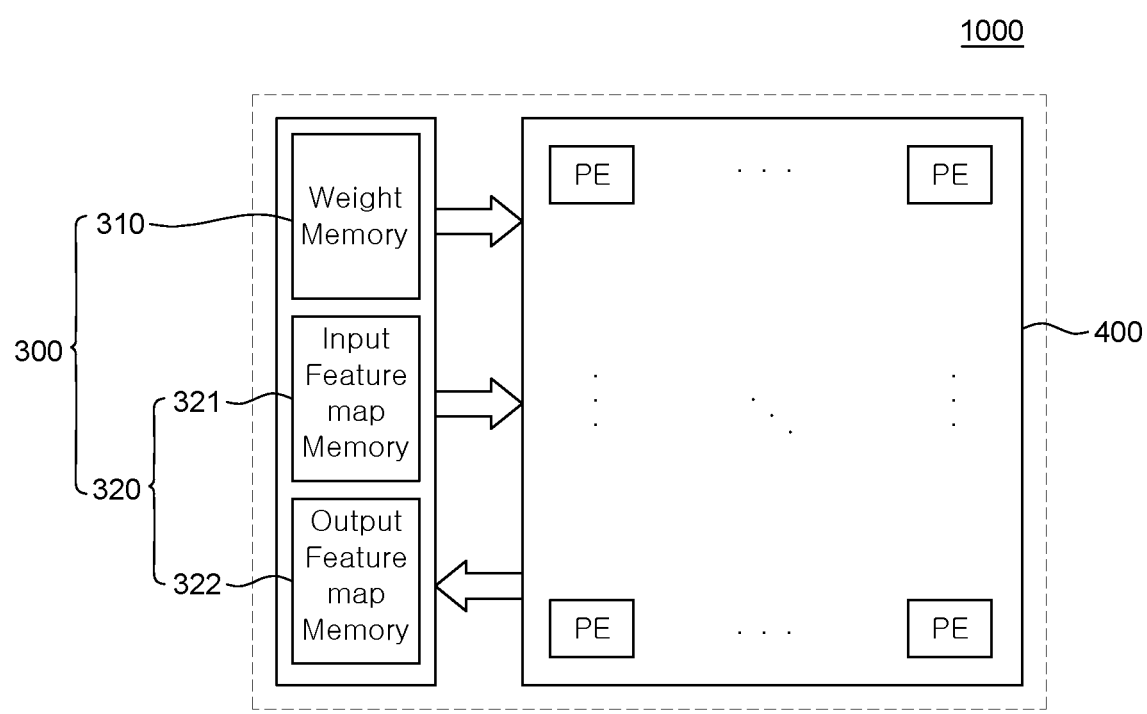
FIGS. 3 and 4 is a diagram respectively illustrating a weight memory, an input feature map memory, and an output feature map memory of a neural processing unit including a variable memory according to an example of the present disclosure.
Figure 4:
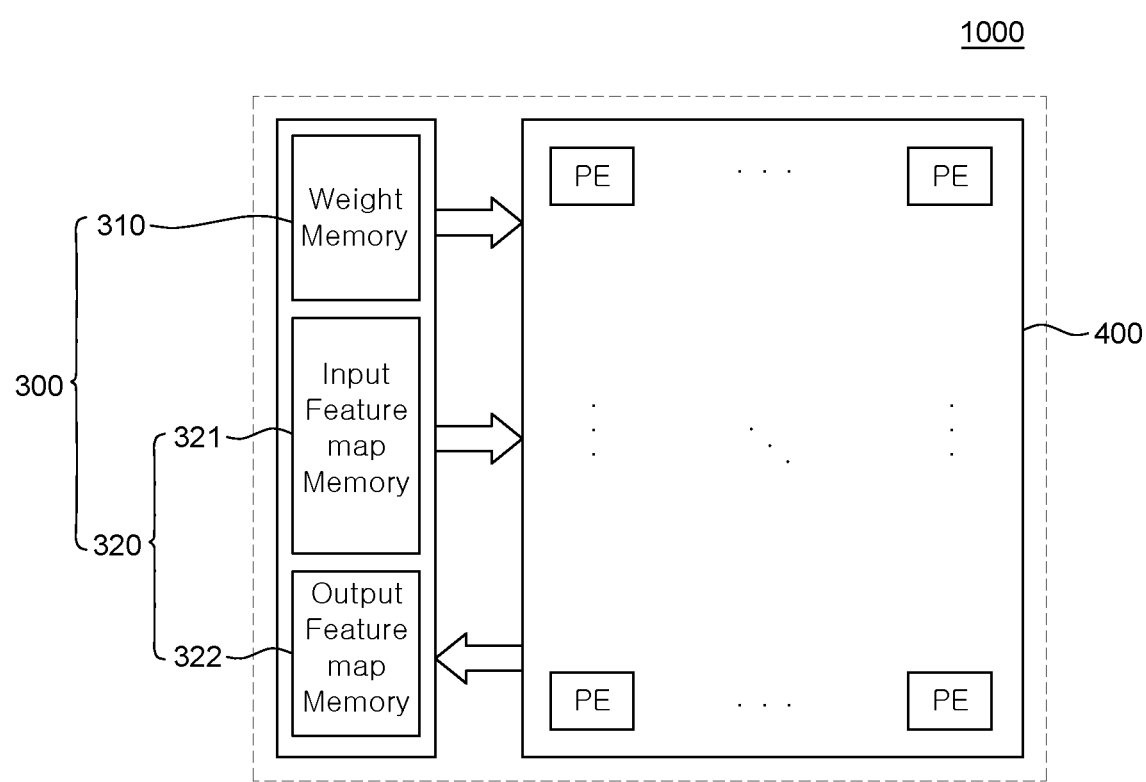

Hereinafter, an operation of the variable memory included in the neural processing unit will be described with reference to FIGS. 2 to 4. In FIGS. 2 to 4, only the variable memory and the plurality of processing elements included in the neural processing unit are illustrated for convenience of explanation. However, the operation of the variable memory included in the neural processing unit will be described below with reference to the components shown in FIG. 1.

FIG. 2 illustrates a weight memory and a feature map memory of a neural processing unit including a variable memory according to an example of the present disclosure. FIGS. 3 and 4 respectively illustrate a weight memory, an input feature map memory, and an output feature map memory of a neural processing unit including a variable memory according to an example of the present disclosure.

Referring to FIG. 2, the variable memory 300 may include a weight memory 310 and a feature map memory 320.

The weight memory 310 means a set of a plurality of memory units for storing weights, and the feature map memory 320 may refer to a set of a plurality of memory units that stores any one of an input feature map and an output feature map.

The weight memory 310 may be referred to as a weight domain of the variable memory 300. The feature map memory 320 may be referred to as a feature map domain of the variable memory 300.

In addition, the ratio of the capacity of the weight memory 310 to the capacity of the feature map memory 320 may vary for processing each layer of each artificial neural network model. That is, the number of the plurality of memory units included in the weight memory 310 may vary for each layer of each artificial neural network model, and the number of the plurality of memory units included in the feature map memory 320 may vary. That is, the neural processing unit 1000 may set the number of units of the weight memory 310 and the feature map memory 320 in correspondence with characteristics of each layer of an artificial neural network model.

Each memory unit of the variable memory 300 may have the same size as each other. For example, the capacity of each memory unit of the variable memory 300 may be 1 Kbyte, 2 Kbyte, 4 Kbyte, 8 Kbyte, 16 Kbyte, 32 Kbyte, 64 Kbyte, 128 Kbyte, 256 Kbyte, 512 Kbyte, or 1,024 Kbyte. However, examples of the present disclosure are not limited to the capacity of the memory unit.

The size of each memory unit of the variable memory 300 may be configured respectively. For example, the capacity of each memory unit of the variable memory 300 may be different from each other. Alternatively, the capacity of some memory units may be 4 Kbyte, and the capacity of another memory unit may be 32 Kbyte. However, examples of the present disclosure are not limited to the capacity of the memory unit.

In detail, according to examples of the present disclosure, a memory unit may also be referred to as a memory bank.

Figure 8:
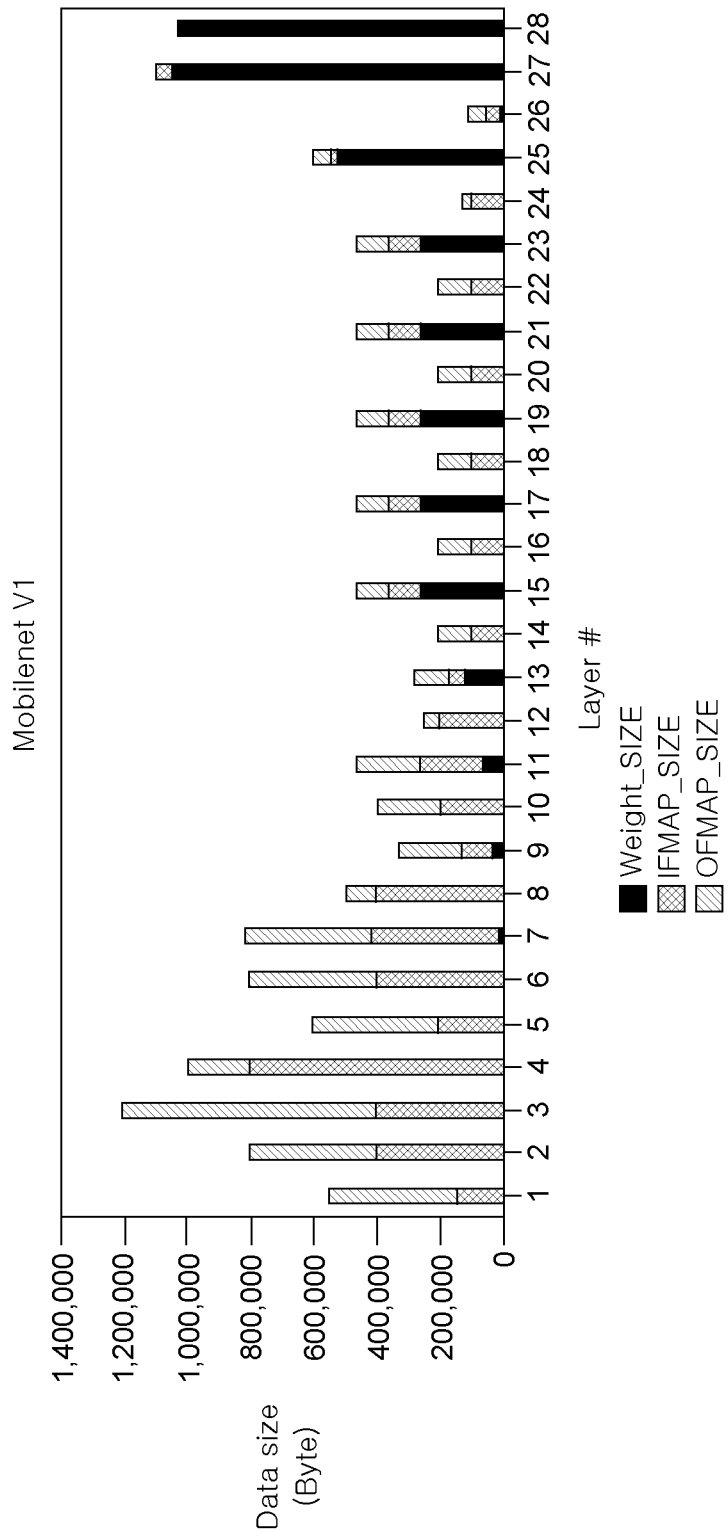
FIG. 8 is a diagram illustrating data size information for each layer of an artificial neural network model processed by a neural processing unit including a variable memory according to an example of the present disclosure.

For example, referring to FIG. 8 and Table 1, when calculating the first layer, the controller 100 may set the capacity of the weight memory 310 to 1 Kbyte. In addition, when calculating the first layer, the controller 100 may set the capacity of the feature map memory 320 to 552 Kbyte. Accordingly, the variable memory 300 is able to secure a memory capacity reAI calculationuired for the first layer operation of the artificial neural network model of FIG. 8 and Table 1.

In more detail, the neural processing unit 1000 may control the capacity of each domain of the variable memory 300 based on the structural data of the artificial neural network model to be processed.

Here, the structural data of the artificial neural network model may include the number of layers of the artificial neural network model, an operation order of each layer, information on the size of a feature map and weight size of each layer, and the like. The size of the feature map of each layer may be subdivided into the size of the input feature map and the size of the output feature map. This will be described later with reference to FIGS. 3 and 4. The structural data of the variable memory may include the number of a plurality of memory units, a capacity of each memory unit, and an address or identification code of each memory unit. Also, the structure data of the variable memory may include domain information of each currently set memory unit.

Referring to FIGS. 3 and 4, the feature map memory 320 may include an input feature map memory 321 and an output feature map memory 322. That is, the feature map memory 320 may mean a set of a plurality of memory units for storing an input feature map and a plurality of memory units for storing an output feature map. In order to process a specific artificial neural network model, the compiler of the neural processing unit 1000 may perform optimal operation scheduling based on the structural data of the corresponding artificial neural network model and the structural data of the variable memory 300.

The optimal operation scheduling based on the variable memory 300 may mean that the utilization rate (%) of the variable memory 300 can be maximized when calculating each layer of the artificial neural network model. When the utilization rate (%) of the variable memory 300 is maximized, there is an effect of maximally caching data from the main memory 3000. Accordingly, there is an effect that the freAI calculationuency of data transmission between the variable memory 300 and the main memory 3000 can be reduced. Furthermore, when the total capacity of the variable memory 300 is smaller than the data size of the weight and the feature map of one layer to be processed by the neural processing unit 1000, it may be necessary to tile the weight or the feature map. Even in this case, when the utilization rate (%) of the variable memory 300 is maximized, the number of tiles processed by the neural processing unit 1000 can be minimized.

In more detail, one memory unit may be configured to store data of one domain. However, the memory unit according to examples of the present disclosure is not limited thereto, and one memory unit may store data of a plurality of domains. For example, the capacity of one memory unit may be 1,024 Kbyte. In this case, it is also possible that the input feature map data of 512 Kbyte size and the output feature map data of the 512 Kbyte size are stored in one memory unit. In other words, when the variable memory is a dual-port SRAM, the corresponding memory unit can perform both read and write operations at the same time. Accordingly, it is also possible to simultaneously process input feature map reading and output feature map writing in one memory unit. In addition, in order to simultaneously process a read operation and a write operation, the variable memory 300 may be configured to include a read-only multiplexer and a write-only multiplexer, respectively.

In other words, it is also possible for one memory unit to store data of the input feature map domain and data of the weight domain. However, in this case, since the input feature map data and the weight data need to be read simultaneously from one memory unit, the input feature map and the weight data may need to be seAI calculationuentially read every clock cycle. Accordingly, it may be more efficient to store the input feature map data and the output feature map data together than to store the input feature map data and the weights together in one memory unit. Accordingly, the compiler can generate the machine code that avoids storing the input feature map and the weight in one memory unit. That is, the compiler may analyze the size of data corresponding to each domain of each layer and avoid inefficient allocation of a plurality of domains to one memory unit.

In more detail, when the variable memory 300 is a single-port SRAM, the compiler may generate a machine code configured to store data of only one domain in one memory unit, if possible.

The controller 100 may be configured to control the variable memory 300 according to structural data of an artificial neural network model included in a binary file compiled to be operable in the neural processing unit 1000.

For example, the structural data of the artificial neural network model may be data included in a file format such as open neural network exchange (ONNX), PyTorch, or TensorFlow. However, the present disclosure is not limited to a specific file format. The compiler may convert the file format or the like into a binary file based on structural data of the variable memory. Here, the binary file may refer to a file of a format capable of controlling the operation of the neural processing unit. Here, the binary file may also be referred to as machine code.

Referring to FIG. 3, the controller 100 may set the capacity of each of the weight memory 310, the input feature map memory 321, and the output feature map memory 322 to be eAI calculationual to each other in the first operation step of the specific artificial neural network model. That is, the number of the plurality of memory units configuring the weight memory 310, the number of the plurality of memory units configuring the input feature map memory 321, and the number of the plurality of units configuring the output feature map memory 322 may be set to be the same in the first operation step. The input feature map memory 321 and the output feature map memory 322 may be referred to as a feature map memory 320.

Referring to FIG. 4, in a second operation step subseAI calculationuent to the first operation step, the capacity of each of the weight memory 310, the input feature map memory 321, and the output feature map memory 322 included in the variable memory 300 may be set differently. In other words, in the second operation step, the number of the plurality of memory units configuring the weight memory 310, the number of the plurality of memory units configuring the input feature map memory 321, and the number of the plurality of units configuring the output feature map memory 322 may be set differently. That is, the number of the plurality of memory units configuring the feature map memory 320 may be set differently.

Here, one operation step may mean an operation step in which the plurality of processing elements 400 of the neural processing unit 1000 process specific input feature map data and specific weight data stored in each domain of the variable memory 300. For example, the first operation step may be an operation of the first layer of the artificial neural network model. The second operation step may be an operation of the second layer of the artificial neural network model.

For example, the first operation step may be the operation of the first tile of the first layer of the artificial neural network model. The second operation step may be an operation of the second tile of the first layer of the artificial neural network model. The compiler may be configured to determine the number of tiles for each layer based on the memory size of the variable memory 300 of the neural processing unit 1000 and the data size of the feature map and weight of a specific layer of the artificial neural network model.

For example, in FIG. 4, when the capacity of the input feature map memory 321 reAI calculationuired in the second layer is large, the controller 100 may set the capacity of the input feature map memory 321 to be relatively large and may set the capacity of each of the weight memory 310 and the output feature map memory 322 to be relatively small. Accordingly, even if the total capacity of the variable memory 300 does not increase, the capacity allocated to the input feature map memory 321 may be increased. Accordingly, there is an effect of improving the utilization rate (%) of the variable memory 300.

Specifically, when the capacity of the input feature map memory 321 reAI calculationuired in the second layer is large, the controller 100 may increase the number of the plurality of memory units configuring the input feature map memory 321, decrease the number of the plurality of memory units configuring the weight memory 310, and decrease the number of the plurality of memory units configuring the output feature map memory 322. The input feature map memory 321 and the output feature map memory 322 may be referred to as a feature map memory 320.

In more detail, the size of the feature map and weight for each layer of the artificial neural network model may be defined in advance. Accordingly, when processing a specific artificial neural network model, the neural processing unit 1000 may schedule the operation of the neural processing unit 1000 based on information on the size of a feature map and weight for each layer of the artificial neural network model.

For example, the capacity of each memory unit of the variable memory 300 may be a specific unit. For example, the first group of memory units may be grouped and defined as the weight memory 310. For example, the memory units of the second group may be grouped and defined as the input feature map memory 321. For example, the memory units of the third group may be grouped and defined as the output feature map memory 322. Such definition may be set differently for each operation step.

The controller 100 may be configured to control the DMA 200 and the variable memory 300 based on previously analyzed operation scheduling information. The controller 100 may be configured to control the DMA 200 so that the DMA 200 controls the variable memory.

In particular, when information on processing order of layers of the artificial neural network model, and the size information of the feature map and the weights for each layer is provided, the neural processing unit 1000 may determine in advance how to allocate the capacity of the weight memory 310 and the capacity of the feature map memory 320. Accordingly, the neural processing unit 1000 may operate according to a determined scheduling order, and may not perform an additional scheduling determination process for allocating capacity for the weight and feature maps of the variable memory 300. Accordingly, the operation of the variable memory 300 of the neural processing unit 1000 may be optimized based on the information obtained by analyzing the weight size and the feature map size of each layer of the artificial neural network model. Here, the analyzed information may be included in the machine code compiled by the artificial neural network model.

Hereinafter, the internal configuration and operation of the variable memory 300 included in the neural processing unit will be described in detail with reference to FIGS. 5 to 8.

Figure 5:
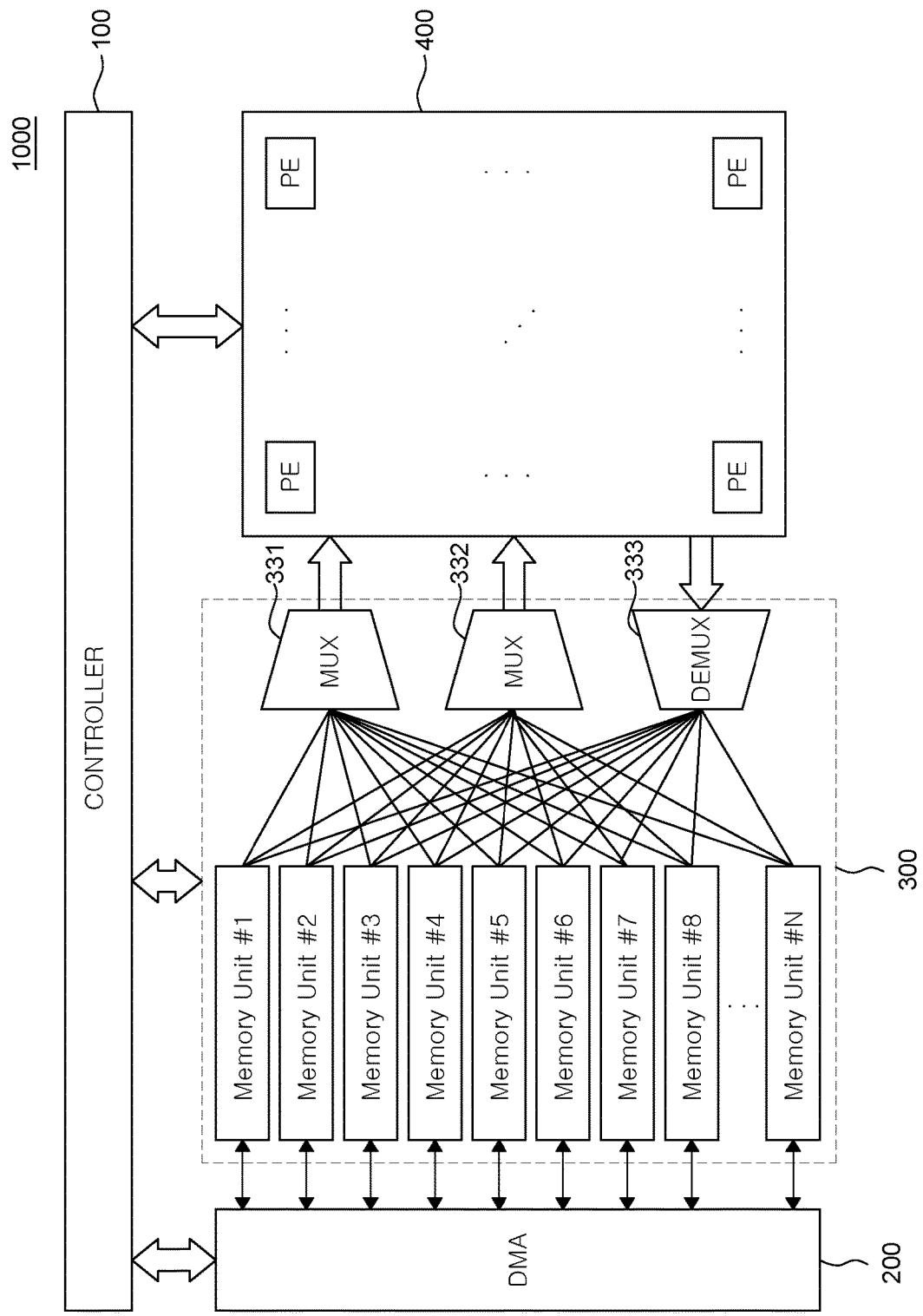
FIG. 5 is a diagram illustrating an internal configuration of a variable memory of a neural processing unit including a variable memory according to an example of the present disclosure.
Figure 6:
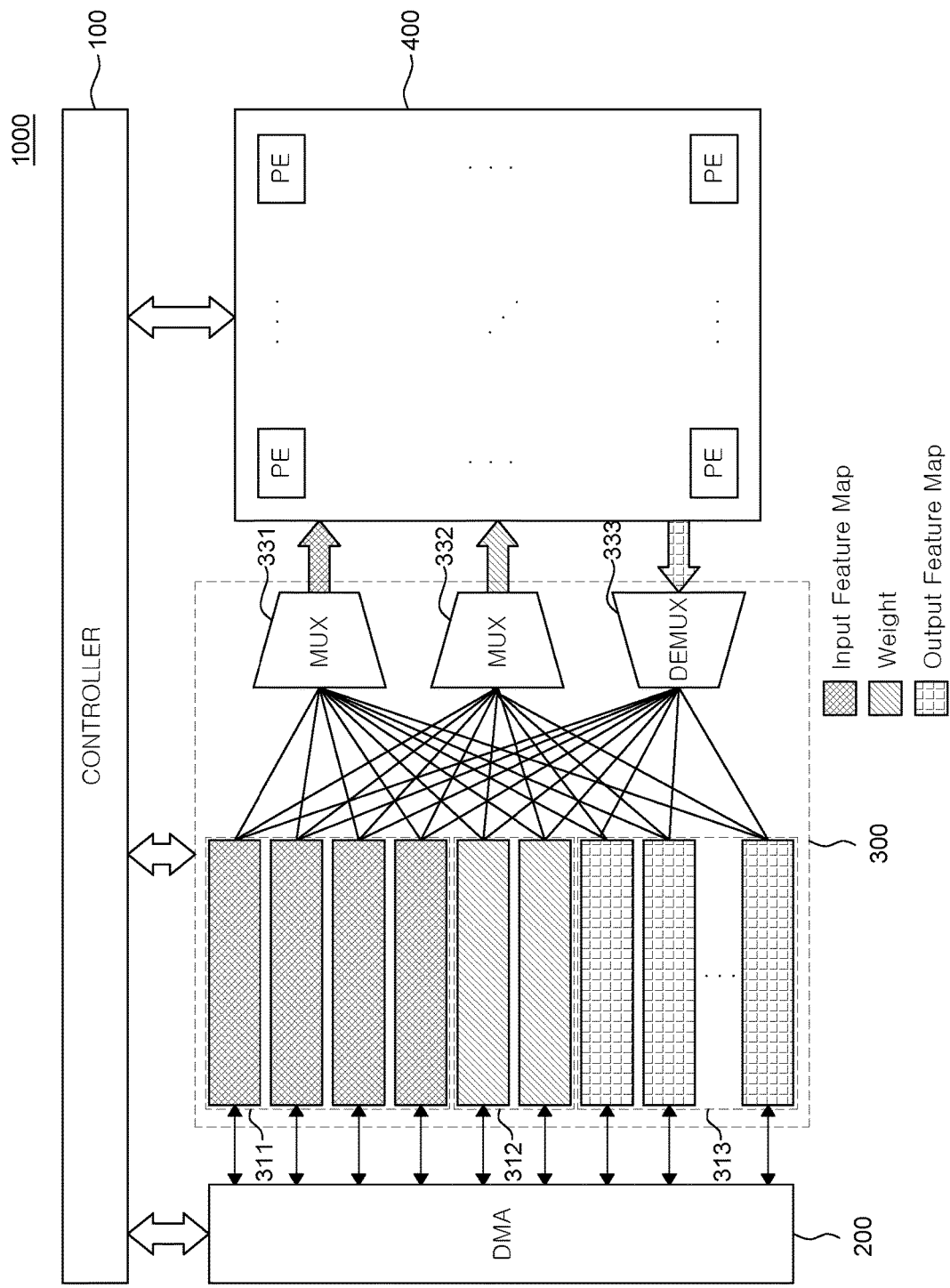
FIGS. 6 and 7 are diagrams respectively illustrating operation examples of a plurality of memory units including a weight memory, an input feature map memory, and an output feature map memory of a neural processing unit including a variable memory according to an example of the present disclosure.
Figure 7:
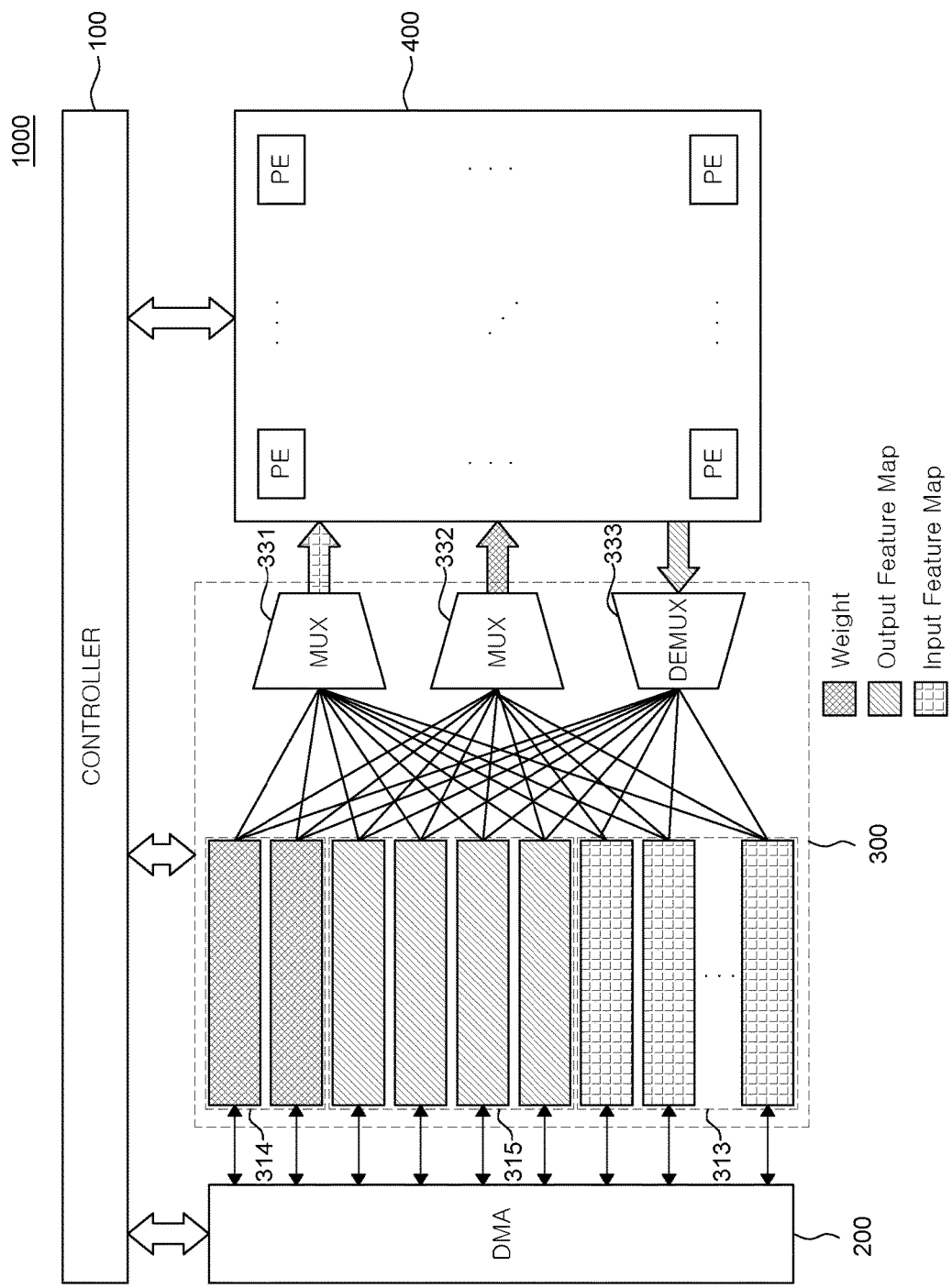

FIG. 5 illustrates an internal configuration of a variable memory of a neural processing unit including a variable memory according to an example of the present disclosure. FIGS. 6 and 7 respectively illustrate operation examples of a plurality of memory units including a weight memory, an input feature map memory, and an output feature map memory of a neural processing unit including a variable memory according to an example of the present disclosure.

Referring to FIG. 5, the variable memory 300 may include a plurality of memory units, an input feature map multiplexer 331, a weight multiplexer 332, and an output feature map demultiplexer 333. However, examples of the present disclosure are not limited to a multiplexer and a demultiplexer, and the multiplexer and the demultiplexer may be referred to as a switch, a selector, an allotter, and the like.

For example, the input feature map multiplexer 331 may be referred to as a first selector. For example, the weight multiplexer 332 may be referred to as a second selector. For example, the output feature map demultiplexer 333 may be referred to as a third selector.

Each of the plurality of memory units may store any one of an input feature map, a weight, and an output feature map. Further, the data stored in the memory unit is not fixed to any one of the input feature map, the weight, and the output feature map, but may be changed to another one of the input feature map, the weight, and the output feature map as needed.

In addition, each of the plurality of memory units may store at least one of the input feature map and the weight from the main memory 3000 through the DMA 200. In addition, each of the plurality of memory units may store the output feature map, which is a result of performing the convolution operation of the input feature map and the weight, from the plurality of processing elements 400. Each memory unit may have the same size as each other. Alternatively, the size of each memory unit of the variable memory 300 may be individually set to have a specific capacity.

In more detail, the output feature map according to the examples of the present disclosure should be interpreted in a comprehensive sense. For example, the output feature map may be a result of a convolution operation. Further, the output feature map may include cases where algorithms such as activation function operation, pooling operation, stride operation, batch-normalization operation, skip-connection operation, concatenation operation, AI calculationuantization operation, clipping operation, and padding operation are selectively applied to the convolution result. Accordingly, the processing element (PE) may be configured to further include processing circuitry for the additional algorithms. The neural processing unit 1000 may be configured to further include at least one processing circuitry for implementing at least one of the above-described algorithms. Here, the output unit of the additional processing circuit may be referred to as an output unit (i.e., output feature map) of the processing element (PE).

For example, a first input of the processing element (PE) may be coupled to the input feature map multiplexer 331.

For example, a second input of the processing element (PE) may be coupled to a weight multiplexer 332.

For example, an output of the processing element (PE) may be coupled to the output feature map demultiplexer 333.

Accordingly, through a plurality of selectors (e.g., a first selector, a second selector, and a third selector) connected to each of the first input unit, the second input unit, and the output unit of the processing element (PE), the variable memory 300 may transmit the weight data, the input feature map data, and the output feature map data in one clock cycle.

In addition, by adjusting the ratio of the memory capacity of each domain of the variable memory 300 for each operation step, the utilization rate (%) of the variable memory 300 can be maximized for operation step of each layer of the artificial neural network model. As described above, each operation step may be one operation of one layer operation of the artificial neural network model or one operation of a plurality of tiles of one layer.

In more detail, the controller 100 may control the DMA 200, the input feature map multiplexer 331, the weight multiplexer 332, and the output feature map demultiplexer 333. Accordingly, the controller 100 may control data read and write operations in each memory unit to which a specific domain is allocated. Accordingly, each memory unit of the variable memory 300 may operate as a memory of a specific domain.

Each of the plurality of memory units may be configured to communicate with an input feature map multiplexer 331, a weight multiplexer 332, and an output feature map demultiplexer 333.

Each of the plurality of memory units may be configured to be selected by any one of an input feature map multiplexer 331, a weight multiplexer 332, and an output feature map demultiplexer 333. Accordingly, a specific memory unit selected by any one of the input feature map multiplexer 331, the weight multiplexer 332, and the output feature map demultiplexer 333 can perform a read operation or a write operation.

The variable memory 300 may be coupled to the DMA 200, and the plurality of memory units of the variable memory 300 may communicate with any one of an input feature map multiplexer 331, a weight multiplexer 332, and an output feature map demultiplexer 333.

The DMA 200 may control a read operation or a write operation of each memory unit so that a weight or a feature map is accessed to each memory unit.

The input feature map multiplexer 331 may output some of the input feature map data stored in at least one of the plurality of memory units to the plurality of processing elements 400.

The input feature map multiplexer 331 may be connected to a plurality of processing elements 400 and a plurality of memory units. Specifically, a plurality of input units of the input feature map multiplexer 331 are connected to output units of a plurality of memory units. In addition, an output unit of the input feature map multiplexer 331 is connected to an input of the plurality of processing elements 400. More specifically, an output of the input feature map multiplexer 331 may be connected to a first input of the processing element (PE).

The weight multiplexer 332 outputs some of the weights stored in at least one of the plurality of memory units to the plurality of processing elements 400.

The weight multiplexer 332 may be coupled to the plurality of processing elements 400 and the plurality of memory units. Specifically, a plurality of input units of the weight multiplexer 332 are connected to output units of a plurality of memory units. Further, the output of the weight multiplexer 332 is connected to the input of the plurality of processing elements 400. More specifically, an output of the weight multiplexer 332 may be connected to a second input of the plurality of processing elements 400.

The output feature map demultiplexer 333 may output the output feature map processed by the plurality of processing elements 400 to at least one of the plurality of memory units. That is, the output feature map demultiplexer 333 outputs the output feature map calculated by the plurality of processing elements 400 to at least one of the plurality of memory units according to the operation scheduling of each layer of the artificial neural network model.

The output feature map demultiplexer 333 may be connected to a plurality of processing elements 400 and a plurality of memory units. Specifically, a plurality of output units of the output feature map demultiplexer 333 are connected to input units of a plurality of memory units. In addition, the input of the output feature map demultiplexer 333 is connected to the output of the plurality of processing elements 400. More specifically, an input of the output feature map demultiplexer 333 may be connected to an output of the plurality of processing elements 400. The controller 100 may schedule data stored in a plurality of memories according to an operation order of each layer of the artificial neural network model. That is, the controller 100 may control to store any one of an input feature map, a weight, and an output feature map in each of the plurality of memory units based on the machine code including information on which the calculation steps are scheduled for each layer of the artificial neural network model.

The above-described machine code may be a code generated before the computation of the artificial neural network model by analyzing the artificial neural network model in a compiler external to the neural processing unit. That is, the machine code may include input feature map, weight, and output feature map information for each of a plurality of layers of the artificial neural network model by analyzing a specific artificial neural network model to be processed by the neural processing unit 1000. In more detail, since the machine code is generated based on the structure information of the variable memory 300 of the neural processing unit 1000, it may be a dedicated machine code of the neural processing unit 1000. The machine code may also be stored in the controller 100. However, the machine code according to the examples of the present disclosure is not limited thereto, and the machine code may be stored in a specific memory provided at a specific location of the neural processing unit 1000.

More specifically, the machine code may include capacity information of an input feature map, capacity information of a weight, and capacity information of an output feature map for each of the plurality of layers of the artificial neural network model.

FIG. 8 illustrates data size information for each layer of an artificial neural network model processed by a neural processing unit including a variable memory according to an example of the present disclosure.

In FIG. 8, data size information is shown for each layer of the Mobilenet V1 model, which is an example of an artificial neural network model, and the exact data size information is shown in Table 1 below.

Each layer of the Mobilenet V1 model includes at least a weight data size, an input feature map data size, and an output feature map size. The exemplary Mobilenet V1 artificial neural network model is characterized in that it is designed to obtain a complete inference result by calculating from the first layer to the 28th layer in ascending order. Each layer may further include information such as a convolution operation, an activation function operation, a pooling operation, a stride operation, a batch-normalization operation, a skip-connection operation, a concatenation operation, a AI calculationuantization operation, a clipping operation, a padding operation, and the like. However, since the information is not essential when controlling the variable memory 300, unnecessary description may be omitted.

TABLE 1

Mobilenet V1 Data size (Byte)

| Layer # | Weight_SIZE | IFMAP_SIZE | OFMAP_SIZE |
|---|---|---|---|
| 1 | 864 | 150,528 | 401,408 |
| 2 | 288 | 401,408 | 401,408 |
| 3 | 2,048 | 401,408 | 802,816 |
| 4 | 576 | 802,816 | 200,704 |
| 5 | 8,192 | 200,704 | 401,408 |
| 6 | 1,152 | 401,408 | $01,408 |
| 7 | 18,384 | 401,408 | 401,408 |
| 8 | 1,152 | 401,408 | 100,352 |
| 9 | 32,768 | 100,352 | 200,704 |
| 10 | 2,304 | 208,704 | 200,704 |
| 11 | 66,536 | 200,704 | 200,704 |
| 12 | 2,304 | 200,704 | 50,178 |
| 13 | 131,072 | 50,176 | 100,352 |
| 14 | 4,608 | 100,352 | 100,352 |
| 35 | 262,144 | 100,352 | 100,352 |
| 16 | 4,608 | 100,352 | 100,352 |
| 17 | 262,144 | 100,352 | 100,352 |
| 18 | 4,608 | 100,352 | 100,352 |
| 19 | 262,144 | 100,352 | 100,352 |
| 20 | 4,608 | 100,352 | 100,352 |
| 21 | 262,144 | 100,352 | 100,352 |
| 22 | 4,608 | 100,352 | 100,352 |
| 23 | 262,144 | 100,352 | 100,352 |
| 24 | 4,608 | 100,352 | 25,088 |
| 25 | 524,288 | 25,088 | 50,176 |
| 26 | 9,216 | 50,178 | 50,176 |
| 27 | 1,048,576 | 50,176 | 1,024 |
| 28 | 1,024,000 | 1,024 | 1,000 |

The Mobilenet V1 model consists of a total of 28 layers, and the capacity information of the input feature map, the capacity information of the weight, and the capacity information of the output feature map of each of the plurality of layers may be different.

The compiler may analyze the above-described artificial neural network model before operation and may generate machine code including capacity information of input feature maps of each of the plurality of layers, capacity information of weights, and capacity information of output feature maps.

In addition, the machine code may include an artificial neural network data locality corresponding to allocation of a plurality of memory units for each of an input feature map, a weight, and an output feature map in each of the plurality of layers of the artificial neural network model.

The aforementioned artificial neural network data locality is data for setting whether each of the input feature map, the weight, and the output feature map of each of the plurality of layers is to be stored in a specific memory unit among the plurality of memory units.

The compiler can define the artificial neural network data locality by utilizing the fact that the structure of the artificial neural network model is fixed. Therefore, the defined artificial neural network data locality can be maintained the same until the structure of the artificial neural network model is changed.

Therefore, by using artificial neural network data locality, what data (e.g., input feature map and weight) will be reAI calculationuested from the neural processing unit 1000, and what data (e.g., output feature map) the neural processing unit 1000 will be output can be known in advance for each operation step of a specific artificial neural network model. Accordingly, the controller 100 may acAI calculationuire the data size of each domain reAI calculationuired for each operation step. Accordingly, the controller 100 may determine the number of memory units of the variable memory 300 reAI calculationuired for each domain for each operation step based on the data size of each domain reAI calculationuired for each operation step. Accordingly, the controller 100 may set each of the memory units of the variable memory 300 as a memory of a specific domain for each operation step.

Finally, the controller 100 may be operated based on the machine code in which the domain setting of the memory units of the variable memory 300 is scheduled for every operation step of all layers of the artificial neural network model. Accordingly, the neural processing unit 1000 has an effect of maximizing the utilization rate (%) of the variable memory 300 for each operation step.

As described above in Table 1, the capacity information of the input feature map, the capacity information of the weight, and the capacity information of the output feature map of each of the plurality of layers may be different. Artificial neural network data locality in each of the plurality of layers may also be different.

Due to the pre-analysis of the artificial neural network model in the compiler, the operation order of each of the plurality of layers of the artificial neural network model may also be recorded in the machine code. Accordingly, the machine code may include operation order information of each of the plurality of layers of the artificial neural network model.

The compiler may determine the tiling based on the total capacity of the variable memory 300 and the size of data of each domain of each layer of the artificial neural network model.

For example, the third layer of the exemplary artificial neural network model of FIG. 8 has the largest data size among all layers. That is, the sum of the weight data size, the output feature map data size, and the input feature map data size is 1.2 Mbyte. If the capacity of the variable memory 300 is 2 Mbyte, tiling of all layers may be unnecessary. If the capacity of the variable memory 300 is 1 Mbyte, tiling may be reAI calculationuired for the third layer operation. In this case, for the third layer operation, the third layer may be divided into a first tile and a second tile, and each tile may be seAI calculationuentially processed. That is, according to the capacity of the internal memory, the compiler may process one layer as one operation step or as a plurality of operation steps divided into a plurality of tiles.

According to an example of the present disclosure, it is possible to define the data locality of the first operation step and the second operation step of the variable memory 300 by utilizing the artificial neural network data locality of the artificial neural network model. Accordingly, the compiler may analyze that the same data locality exists in a plurality of operation steps with respect to the variable memory 300 and generate machine code configured to reuse memory units having the same data locality. Accordingly, the controller 100 may be configured to control the variable memory 300 by machine code.

For example, when the same data locality exists in the first operation step and the second operation step, the controller 100 may control the variable memory 300 to reuse data stored in the variable memory 300 in the first operation step to the second operation step.

Here, the reuse of data may mean that the output feature map data stored in the variable memory 300 is not moved to the main memory 3000, but is reused as an input feature map in the processing element (PE) once again. However, examples of the present disclosure are not limited to the feature map, and any data having the same data locality may also be reused.

Here, for example, the first operation step defined in the machine code may be the operation of the first layer of the artificial neural network model of FIG. 8 and Table 1. Then, for example, the second operation step defined in the machine code may be the operation of the second layer of the artificial neural network model of FIG. 8 and Table 1.

First, referring to FIGS. 5 and 6, in the first exemplary operation step based on the artificial neural network data locality, the first to fourth memory units store the input feature maps of the first layer, the fifth and sixth memory units store the weights of the first layer, and the seventh to Nth memory units store the output feature maps of the first layer. Here, the output feature map of the first layer may be a result value calculated based on the input feature map of the first layer and the weight of the first layer.

The controller 100 may control the DMA 200 to write the input feature map to the first memory group 311 set as the input feature map memory 321 among the plurality of memory units based on the machine code set for each operation step of the artificial neural network model.

That is, referring to FIGS. 5 and 6, the controller 100 may control the DMA 200 based on the artificial neural network data locality recorded in the machine code. The DMA 200 may read the input feature map reAI calculationuired for the first operation step (e.g., the first layer operation step) from the main memory 3000 and write the input feature map to each of the first to fourth memory units.

The first to fourth memory units in which the input feature map of the first layer necessary for the first operation step (e.g., the first layer operation step) is stored may be set as the first memory group 311 and may be defined as the input feature map domain.

After the input feature map of the first layer is stored in the first memory group 311, the controller 100 may control the input feature map multiplexer 331 so that the input feature map multiplexer 331 outputs the input feature map of the first layer stored in the first memory group 311 to the plurality of processing elements 400.

Accordingly, in accordance with the operation timing of the input feature map multiplexer 331, the input feature map of the first layer stored in the first memory group 311 may be output to the plurality of processing elements 400.

Meanwhile, the controller 100 may control the DMA 200 to write a weight to the second memory group 312 among the plurality of memory units based on the machine code.

That is, referring to FIGS. 5 and 6, the controller 100 may control the DMA 200 based on the artificial neural network data locality recorded in the machine code. The DMA 200 may read a weight reAI calculationuired for a first operation step (e.g., a first layer operation step) from the main memory 3000 and write the weights to each of the fifth and sixth memory units.

The fifth and sixth memory units in which the weight of the first layer necessary for the first operation step (e.g., the first layer operation step) is stored may be set as the second memory group 312, and may be defined as a weight domain.

After the weight of the first layer is stored in the second memory group 312, the controller 100 may control the weight multiplexer 332 so that the weight multiplexer 332 outputs the weight stored in the second memory group 312 to the plurality of processing elements 400.

Accordingly, the weight multiplexer 332 may output the weight stored in the second memory group 312 to the plurality of processing elements 400 according to the operation timing of the plurality of processing elements 400.

As described above, referring back to FIG. 1, a first input unit (i.e., input feature map) of the processing element (PE) may communicate with an input feature map multiplexer 331. At this time, a second input unit (i.e., weight) of the processing element (PE) may communicate with the weight multiplexer 332. In this case, the input feature map multiplexer 331 selects the first memory group 311 and the weight multiplexer 332 selects the second memory group 312.

Next, in the first operation step, the controller 100 processes the convolution operation by controlling the plurality of processing elements 400 based on the machine code. Accordingly, an output unit (i.e., output feature map) of the processing element (PE) outputs an output feature map of the first layer. Accordingly, the output feature map multiplexer 333 may select a plurality of memory units to store the output feature map to the third memory group 313 among the plurality of memory units.

That is, referring to FIGS. 5 and 6, the controller 100 may control the output feature map demultiplexer 333 to write the output feature map from the plurality of processing elements 400 to each of the seventh to Nth memory units based on the artificial neural network data locality recorded in the machine code, In the first operation step (e.g., the first layer operation step), the seventh to Nth memory units in which the output feature map of the first layer is stored may be set as the third memory group 313 and may be defined as the output feature map domain.

An example of changing and setting a memory to which a weight, an input feature map, and an output feature map are efficiently allocated to the variable memory 300 in the first operation step has been described through the above-described series of processes.

Accordingly, the neural processing unit 1000 including the variable memory 300 of the present disclosure can improve the utilization efficiency of each domain of the internal memory (i.e., the variable memory 300). Furthermore, unnecessary data that is not used for calculations in one layer may not be stored. In addition, maximum storage efficiency can be achieved with a minimum memory size, providing better caching performance.

In addition, since there is no need to inefficiently increase the memory size in the neural processing unit including the internal memory of the present disclosure, the manufacturing yield of the ASIC chip may be increased. In addition, by optimizing the memory size, there is an effect that the power consumption of the neural processing unit can also be reduced.

Hereinafter, an example of reusing the output feature map of the first layer when calculating the second layer using the variable memory 300 will be described with reference to FIGS. 5 to 8.

Referring to FIG. 6, the output feature map of the first layer, which is the output value of the first operation step, is stored in the third memory group 313. Here, the third memory group 313 is defined as an output feature map domain.

Referring to FIG. 7, in the second operation step, the domain of the third memory group 313 may be redefined from the output feature map domain to the input feature map domain. In more detail, the controller 100 may be configured to redefine the domain of a specific memory group defined in the variable memory 300 as another domain when the operation step is changed to another operation step. Further, when the operation step is changed, the controller 100 may reuse the data stored in the memory units having the same data locality of the variable memory 300 for the next operation based on the artificial neural network data locality information included in the machine code.

That is, the output feature map of the first layer may be used as the input feature map of the second layer. Here, the second layer may mean a layer following the first layer. Here, the controller 100 may determine the data locality of the output feature map of the first layer and the data locality of the input feature map of the second layer to be the same. Accordingly, by changing the domain of the preset third memory group 313, there is an effect that data can be reused without actually moving data. That is, the input feature map of the next operation step having the same data locality as the output feature map stored in the variable memory 300 can be reused by the machine code including the artificial neural network data locality information. The machine code may be a code compiled based on the size of each memory unit of the variable memory 300 and the data size of each domain of each layer of the artificial neural network model.

However, examples of the present disclosure are not limited to all layers of the artificial neural network model, and the machine code may include only artificial neural network data locality information corresponding to at least two layers among all layers. That is, even if there are at least two consecutive operation steps, it is possible to determine whether the artificial neural network data locality is the same. Further, if the same data locality is determined, there is an effect that data can be reused through domain change.

In more detail, the neural processing unit 1000 is configured to utilize the structural characteristics of the artificial neural network model in which the output feature map of a specific layer is utilized as the input feature map of the next layer and the reusable characteristics of data having the same data locality.

Referring to FIG. 7, in the second operation step, the input feature map of the second layer is already stored in the seventh to Nth memory units. In this case, the controller 100 may reuse the output feature map of the first layer as the input feature map of the second layer. The seventh to Nth memory units may be maintained as the third memory group 313, and a preset output feature map domain may be redefined as an input feature map domain.

Referring to FIG. 7, in the second operation step, the weights of the second layer may be stored in first and second memory units. Accordingly, the controller 100 may control the DMA 200 to store the weights of the second layer from the main memory 3000 in the first and second memory units. The first and second memory units may be set as the fourth memory group 314 and may be defined as a weight domain.

Referring to FIG. 7, in the second operation step, the output feature map of the second layer may be stored in third to sixth memory units. Accordingly, the controller 100 may store the output feature maps of the second layer from the plurality of processing elements 400 in the third to sixth memory units. The third to sixth memory units may be set as the fifth memory group 315 and may be defined as an output feature map domain. Each memory group may be reset for each operation step according to the analyzed neural network data locality.

So far, an example of reusing the output feature map as the input feature map through domain change in the variable memory 300 by analyzing the same data locality of the artificial neural network model has been described with reference to FIGS. 5 to 8. According to an example of the present disclosure, the compiled machine code may analyze at least two layers and may reuse the feature map stored in the variable memory 300.

In other words, according to examples of the present disclosure, each memory unit may be referred to as a respective memory bank. Each memory unit may be controlled based on a memory bank identification number or memory address.

The input feature map multiplexer 331 may be configured to select memory units of the input feature map domain. The weight multiplexer 332 may be configured to select memory units in the weight domain. The output feature map multiplexer 333 may be configured to select memory units of the output feature map domain.

The controller 100 may control the variable memory 300 by a machine code generated based on the structure data (e.g., the capacity of each of the plurality of memory units and the number of memory units) of the variable memory 300 of the neural processing unit 1000 and size information (e.g., the size of the weight and the size of the feature map of each layer) of each layer of the artificial neural network model.

That is, the controller 100 may schedule a read or write operation of the DMA 200 so that specific data of a specific layer is accessed to a specific memory unit of the variable memory 300 based on the structural data of the variable memory 300 and the structural data of the artificial neural network model. Here, the scheduling may include data locality regarding the operation step of at least two layers.

In more detail, the controller 100 may schedule the domain allocation of the memory unit of the variable memory 300 capable of data reuse based on the information analyzed on the operation order of the plurality of layers of the artificial neural network model and the data locality thereof.

With reference to FIG. 8, the effect of reusing the output feature map will be described in more detail. Each layer of the artificial neural network model processed by the neural processing unit 1000 generates an output feature map having a predetermined data size. In addition, when each output feature map is reused as an input feature map of the next layer, the neural processing unit 1000 may not transmit the output feature map to the main memory 3000. Accordingly, there is an effect that the data transmission amount of the main memory 3000 through the bus 7000 can be reduced.

Hereinafter, a neural processing unit including the variable memory 300' according to another example of the present disclosure will be described. This example differs from that previously described only with respect to the prefetch memory, so the prefetch memory will be mainly described.

Figure 9:
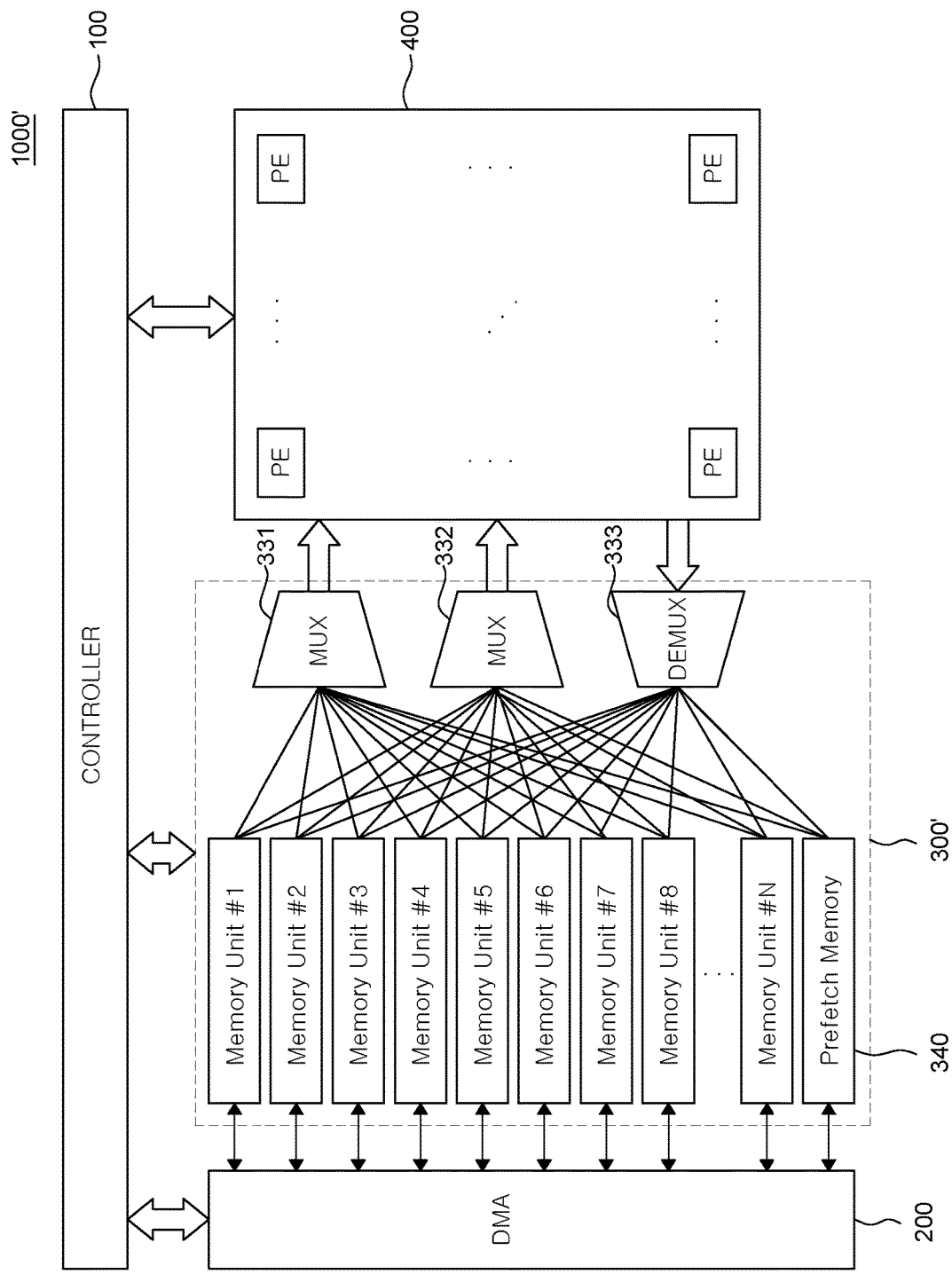
FIG. 9 is a diagram illustrating an internal configuration of a variable memory of a neural processing unit including a variable memory according to another example of the present disclosure.

FIG. 9 illustrates an internal configuration of a variable memory of a neural processing unit including a variable memory according to another example of the present disclosure.

Referring to FIG. 9, the variable memory 300' includes a plurality of memory units, an input feature map multiplexer 331, a weight multiplexer 332, and an output feature map demultiplexer 333. A prefetch memory 340 may be further included.

The prefetch memory 340 may selectively store data reAI calculationuired for operation of the artificial neural network model. That is, the prefetch memory 340 may selectively store any one of a weight, an input feature map, and an output feature map, which may be preserved during operation of the artificial neural network model from the DMA 200 during specific computation steps. The prefetch memory 340 may store a specific value for a specific period based on the data size of each domain of each layer of the artificial neural network model to be processed by the neural processing unit 1000.

For example, referring to Table 1, the weight of the second layer is 288 bytes. Also, the weight of the fourth layer is 576 bytes. In this case, the prefetch memory 340 may preserve the weights of the second layer and the fourth layer. That is, when the size of specific data is significantly small, in order to omit an unnecessary main memory 3000 access operation command, specific data may reside in the prefetch memory 340 in the order of the smallest data size to the largest size data. The resident weights can be reused every time an inference operation is processed.

For example, when the artificial neural network model performs an inference operation at a rate of 60 frames per second, the weights of the first layer may be reused 60 times per second and the weights of the second layer may be reused 60 times per second. In addition, since the size of data to be stored is also very small relatively, it may not substantially affect the overall memory utilization rate.

As another example, when the artificial neural network model has branches other than the layers connected in series, data corresponding to one branch may be stored in the prefetch memory 340. This value may be used for a skip-connection operation or a concatenation operation.

That is, the compiler can decide the data to be stored in the prefetch memory 340 by analyzing the memory unit information of the prefetch memory 340 of the neural processing unit 1000', the structure information of the artificial neural network model, and the data size information of each domain of each layer. For example, the compiler may determine to selectively store weight data smaller than the capacity of the prefetch memory 340. For example, when the capacity of the prefetch memory 340 is 1,024 bytes, the weight of the second layer of 288 bytes and the weight of the fourth layer of 576 bytes may be stored in the prefetch memory 340.

The prefetch memory 340 may be at least one memory unit of the variable memory 300'. However, the present disclosure is not limited thereto. Accordingly, the prefetch memory 340 may be connected to the DMA 200, the input feature map multiplexer 331, the weight multiplexer 332, and the output feature map demultiplexer 333, respectively.

In addition, when the plurality of processing elements 400 and the plurality of memory units are in communication, data necessary for operation of the artificial neural network model may be read from the prefetch memory 340 through the DMA 200.

Meanwhile, the prefetch memory 340 may include a memory such as ROM, SRAM, DRAM, resistive RAM, magneto-resistive RAM, phase-change RAM, ferroelectric RAM, flash memory, or HBM. In some cases, SRAM may be advantageous in terms of arithmetic processing speed.

As described above, in the other example of the present disclosure, when the plurality of processing elements 400 and the plurality of memory units are in communication, data necessary for operation may be loaded in advance by further including the prefetch memory 340 in the variable memory 300' (i.e., internal memory). Also, by preserving specific data in the prefetch memory 340, specific data can be repeatedly reused while minimizing memory usage. Accordingly, the operation speed of the neural processing unit may be further improved.

Figure 10:
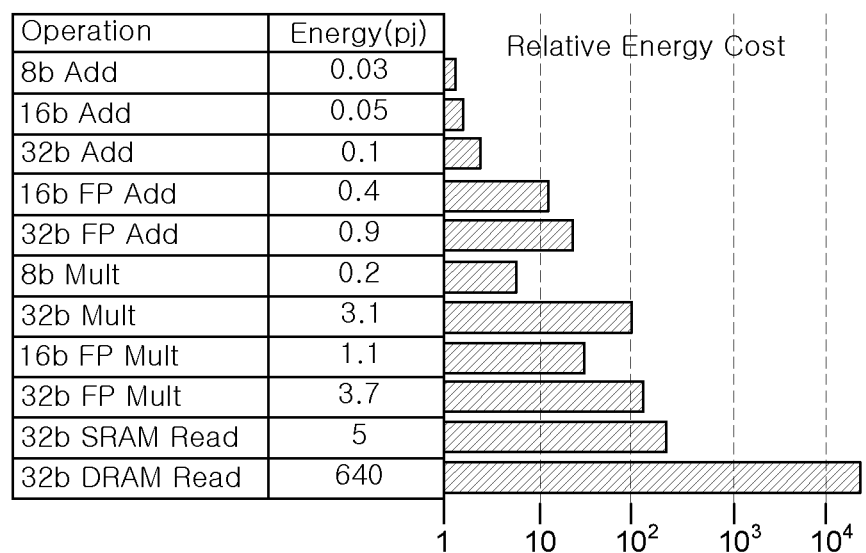
FIG. 10 is a table schematically illustrating energy consumption per unit operation of a system.

FIG. 10 is a table for explaining energy consumption per unit operation of a system.

Referring to FIG. 10, energy consumption can be divided into memory access, addition operation, and multiplication operation.

"Add" in FIG. 10 means an adder. The adder may be included in the processing element (PE). "Mult" in FIG. 10 means a multiplier. A multiplier may be included in the processing element (PE).

"Read" in FIG. 10 means a memory read operation. "SRAM" of FIG. 10 may correspond to the variable memory 300. "DRAM" of FIG. 10 may correspond to the main memory 3000.

"8b Add" refers to the 8-bit integer addition operation of the adder. An 8-bit integer addition operation can consume 0.03 pj of energy.

"16b Add" refers to the 16-bit integer addition operation of the adder. A 16-bit integer addition operation can consume 0.05 pj of energy.

"32b Add" refers to the 32-bit integer addition operation of the adder. A 32-bit integer addition operation can consume 0.1 pj of energy.

"16b FP Add" refers to the 16-bit floating-point addition operation of the adder. A 16-bit floating-point addition operation can consume 0.4 pj of energy.

"32b FP Add" refers to the 32-bit floating-point addition operation of the adder. A 32-bit floating-point addition operation can consume 0.9 pj of energy.

"8b Mult" refers to the multiplier's 8-bit integer multiplication operation. An 8-bit integer multiplication operation can consume 0.2 pj of energy.

"32b Mult" refers to the multiplier's 32-bit integer multiplication operation. A 32-bit integer multiplication operation can consume 3.1 pj of energy.

"16b FP Mult" refers to the multiplier's 16-bit floating-point multiplication operation. A 16-bit floating-point multiplication operation can consume 1.1 pj of energy.

"32b FP Mult" refers to the multiplier's 32-bit floating-point multiplication operation. A 32-bit floating-point multiplication operation can consume 3.7 pj of energy.

For example, when the neural processing unit 1000 performs 32-bit floating-point multiplication and 8-bit integer multiplication, energy consumption per unit operation is approximately 18.5 times different.

"32b SRAM Read" refers to 32-bit data read access when the variable memory 300 of the neural processing unit 1000 is a static random access memory (SRAM). Reading 32-bit data from the variable memory 300 may consume 5 pj of energy.

"32b DRAM Read" refers to 32-bit data read access when the main memory 3000 of the system is DRAM. Reading 32-bit data from the main memory 3000 to the variable memory 300 may consume 640 pj of energy. The energy unit is the pico-joule (pj).

When 32-bit data is read from the main memory 3000 of the system configured of DRAM and when 32-bit data is read from the variable memory 300 configured of SRAM, energy consumption per unit operation is approximately 128 times different.

A point to be noted here is that significant power consumption is used when copying the data of the artificial neural network model from the main memory 3000 to the neural processing unit 1000. In other words, when data having the same data locality of the artificial neural network model is reused in the variable memory 300, power consumption of the system and the neural processing unit 1000 can be significantly reduced.

That is, the neural processing unit 1000 may control reuse of data stored in the variable memory 300, and the neural processing unit 1000 may be configured not to reAI calculationuest a memory access to the main memory 3000 when data is reused based on the structural data of the artificial neural network model or the information of the artificial neural network data locality.

That is, the neural processing unit 1000 according to an example of the present disclosure may minimize the freAI calculationuency of memory access reAI calculationuests to the main memory and may increase the reuse freAI calculationuency of data stored in the variable memory 300 based on the structural data of the artificial neural network model to be operated in the neural processing unit 1000 or the artificial neural network data locality information. Accordingly, the freAI calculationuency of use of the static memory of the variable memory 300 may be increased, and power consumption of the neural processing unit 1000 may be reduced and operation speed may be improved.

That is, the neural processing unit 1000 may control the reuse of data stored in the variable memory 300 based on the structural data of the artificial neural network model or the artificial neural network data locality information, and thus, the neural processing unit 1000 may be configured to suppress a memory access reAI calculationuest to the main memory when data is reused.

Figure 11:
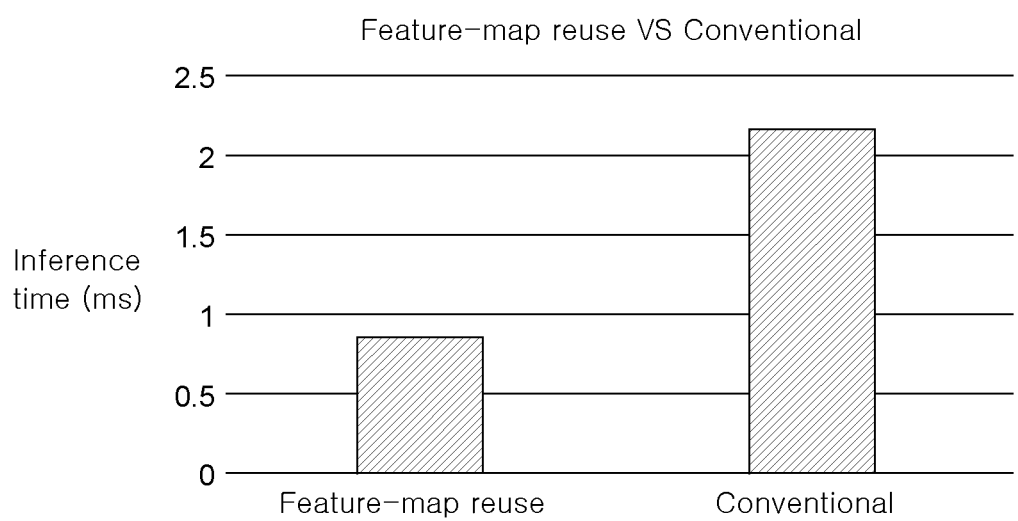
FIG. 11 is a graph illustrating a change in the inference speed of a neural processing unit when an output feature map reuse is applied in a variable memory.

FIG. 11 is a graph illustrating a change in the inference speed of a neural processing unit when an output feature map reuse is applied in a variable memory.

Referring to FIG. 11, the time for the neural processing unit 1000 to process one frame of inference operation of the artificial neural network model in a conventional method was measured to be 2.14 ms. According to an example of the present disclosure, the time for the neural processing unit 1000 to which the feature map reuse is applied based on the same data locality to process one frame of inference operation of the artificial neural network model was measured to be 0.85 ms. That is, when the neural processing unit 1000 reuses the feature map by analyzing the locality of the artificial neural network data of the artificial neural network model, the time for one frame of inference operation processing is reduced from 2.14 ms to 0.85 ms.

That is, even if the same artificial neural network model is processed in the same neural processing unit, when utilizing machine code configured to reuse data from different domains having the same data locality, there is an effect that can significantly improve the inference speed of the neural processing unit 1000 compared to the prior art by controlling the input feature map multiplexer 331, the weight multiplexer 332, and the output feature map demultiplexer 333 that respectively control the domains of the memory units of the variable memory 300.

If one frame of inference time takes 2.14 ms, 467 frames per second (FPS) can be achieved. If one frame of inference takes 0.85 ms, 1,176 FPS per second can be achieved. Here, one frame of inference may mean that the neural processing unit 1000 processes from the first layer to the 28th layer of the exemplary artificial neural network model of FIG. 8. That is, one frame of inference may mean processing all layers of the artificial neural network model.

In other words, when the main memory 3000 is DRAM, data transmission may be delayed due to column address strobe (CAS) latency and row address strobe (RAS) latency in order to access the memory address where the artificial neural network model is stored. Accordingly, when the DMA 200 sends freAI calculationuent data access reAI calculationuests to the main memory 3000, the processing speed of the neural processing unit may be substantially reduced, and when data provision delay occurs by the main memory 3000, the data supply reAI calculationuired for arithmetic processing of the neural processing unit 1000 may be delayed.

That is, according to the examples of the present disclosure, the neural processing unit 1000 has the effect of maximizing the utilization rate of each domain of the variable memory 300 for each operation step by adjusting the size of each domain of the variable memory 300 for each operation step. Also, when the compiler analyzes the output feature map and the input feature map having the same data locality, the feature map can be reused while changing the domain. Accordingly, there is an effect that the processing speed of the neural processing unit 1000 can be significantly improved.

In addition, when the compiler receives the structural data of the artificial neural network model, it is possible to generate machine code in which the reuse of data having the same data locality is scheduled for each operation step.

Figure 12:
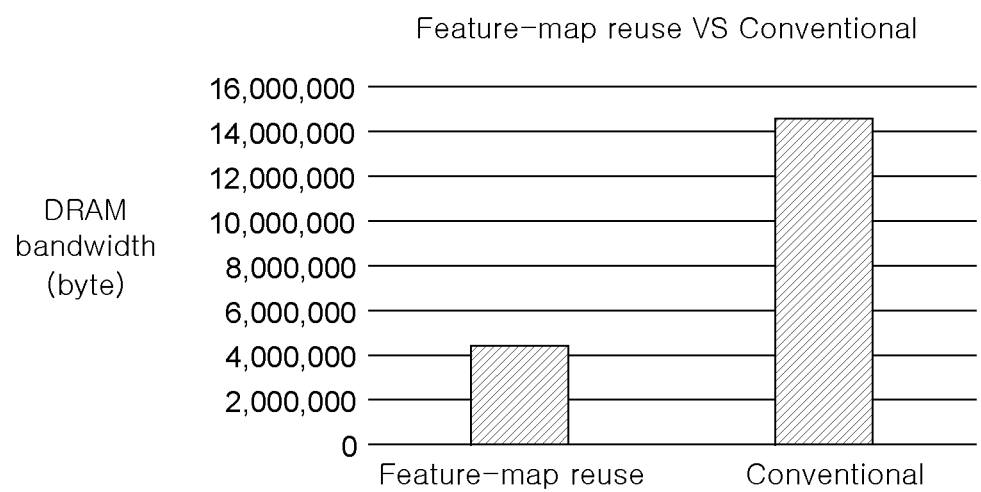
FIG. 12 is a graph comparing the data transfer amount between the neural processing unit and the main memory when the output feature map reuse is applied in the variable memory.

FIG. 12 is a graph comparing the data transfer amount between the neural processing unit and the main memory when the output feature map reuse is applied in the variable memory.

Referring to FIG. 12, the data transfer amount between the neural processing unit 1000 and the main memory 3000 was measured to be 14.4 Mbytes when the neural processing unit 1000 performs one frame of inference operation of the artificial neural network model in a conventional method. According to an example of the present disclosure, a data transfer amount between the neural processing unit 1000 and the main memory 3000 to which feature map reuse is applied based on the same data locality was measured to be 4.36 Mbyte.

That is, when the neural processing unit 1000 reuses the feature map by analyzing the locality of the artificial neural network data of the artificial neural network model, the amount of data transfer between the neural processing unit 1000 and the main memory 3000 for one frame of inference operation is reduced from 14.4 Mbyte to 4.36 Mbyte compare to the conventional method. That is, referring back to Table 1, an input image of 150 Kbyte as an input feature map in the first layer may be received from the image sensor 4000. Thereafter, all the feature maps may be reused for each operation step in the variable memory 300. However, in this case, it is possible when the capacity of the variable memory 300 is larger than the data size of the weight, the input feature map, and the output feature map for each layer. If the capacity of the variable memory 300 is smaller than the data size of the weight, the input feature map, and the output feature map for each layer, a tiling algorithm may be applied.

That is, when the artificial neural network model of FIG. 8 is processed by reusing the feature map, the data transfer amount of the main memory 3000 configured of DRAM can be reduced by 10 Mbytes compared to the conventional method for one frame of inference operation. Again, referring to FIG. 10, the energy consumption per unit operation is about 128 times that of the main memory 3000 compared to the variable memory 300. Accordingly, power consumption by the main memory 3000 may be minimized due to the reuse of the feature map.

That is, according to the examples of the present disclosure, the neural processing unit 1000 may suppress transfer of an unnecessary output feature map to the main memory 3000 by adjusting the size of each domain of the variable memory 300 for each operation step. If the reuse scheduling for the output feature map from the first operation step to the second operation step is not prepared for the neural processing unit 1000, the controller 100 may have to transmit the output feature map to the main memory 3000 in order to secure an available capacity in the internal memory. Thereafter, in order to utilize the output feature map stored in the main memory 3000 as the input feature map of the second operation step, the DMA 200 may read the output feature map stored in the main memory 3000 back into the internal memory. That is, if the same data locality is not analyzed in the subseAI calculationuent operation step, redundant data transmission may occur. The neural processing unit 1000 according to an example of the present disclosure may analyze data locality and control a selector that controls a specific domain of the variable memory 300, for example, first to third selectors, so that the feature map can be reused.

According to examples of the present disclosure, the neural processing unit 1000 may be configured to analyze the data locality of the artificial neural network model and reuse data having the same data locality in successive operation steps.

According to examples of the present disclosure, the neural processing unit 1000 may include a variable memory 300 having each domain and selectors 331, 332, 333 controlling each domain.

According to examples of the present disclosure, the capacity of each domain of the variable memory 300 may be adjusted for each operation step.

According to examples of the present disclosure, an input and an output of the processing element (PE) may be connected to selectors 331, 332, 333 connected to respective domains.

According to the examples of the present disclosure, the controller 100 may control the selectors 331, 332, and 333 by machine code in which the existence of the same data locality is analyzed to reuse the feature map stored in the variable memory 300.

According to the examples of the present disclosure, a neural processing unit may include: an internal memory including a plurality of memory units; and a controller configured to control read and write operations of data of at least one of an input feature map domain, a weight domain, and an output feature map domain with respect to each of the plurality of memory units based on an operation schedule in a machine code in which a plurality of operation steps of an artificial neural network model are set.

According to the examples of the present disclosure, the machine code may include information on input feature map data, weight data, and output feature map data for the plurality of operation steps.

According to the examples of the present disclosure, the machine code may include capacity information on input feature map data, capacity information on weight data, and capacity information on output feature map data for each of the plurality of operation steps of the artificial neural network model.

According to the examples of the present disclosure, the machine code may include information on an operation step having the same data locality among the plurality of operation steps of the artificial neural network model.

According to the examples of the present disclosure, the machine code may include operation order information of each of the plurality of operation steps of the artificial neural network model based on an artificial neural network data locality.

According to the examples of the present disclosure, the neural processing unit may include: a direct memory access (DMA) configured to read data from a main memory and to write input feature map data and weight data to the internal memory; and an artificial intelligence (AI) calculation unit configured to receive and operate the input feature map data and the weight data from the internal memory to generate output feature map data.

According to the examples of the present disclosure, the neural processing unit may include at least one processing element configured to perform a convolution operation of input feature map data and weight data to generate an output feature map data.

According to the examples of the present disclosure, the neural processing unit may include first to third selectors configured to select each of the plurality of memory units based on the machine code; and a processing element including a first input unit configured to receive input feature map data through the first selector, a second input unit configured to receive weight data through the second selector, and output unit configured to output output feature map data through the third selector.

According to the examples of the present disclosure, the internal memory further includes a weight multiplexer, an input feature map multiplexer, and an output feature map demultiplexer, respectively connected to each of the plurality of memory units.

According to the examples of the present disclosure, a neural processing unit may include: an internal memory including a plurality of memory units configured to store data of a first domain, a second domain, and a third domain; an AI calculation unit including a first input unit configured to receive data of the first domain, a second input unit configured to receive data of the second domain, and an output unit configured to output data of the third domain; a first selector configured to connect a memory unit storing data of the first domain among the plurality of memory units to the first input unit; a second selector configured to connect a memory unit storing data of the second domain among the plurality of memory units to the second input unit; and a third selector configured to connect a memory unit storing data of the third domain among the plurality of memory units to the output unit.

According to the examples of the present disclosure, the neural processing unit may include a controller configured to control the first to third selectors by a machine code that analyzes data locality of an artificial neural network model.

According to the examples of the present disclosure, the first selector may be configured to input at least a portion of the data of the first domain to the AI calculation unit according to an operation order defined in the machine code, the second selector may be configured to input at least a portion of the data of the second domain to the AI calculation unit according to the operation order defined in the machine code, and the third selector may be configured to output at least a portion of the data of the third domain to at least one of the plurality of memory units according to the operation order defined in the machine code.

According to the examples of the present disclosure, each of the plurality of memory units may be configured to have a predetermined memory capacity that is the same for each of the plurality of memory units or that is individually set for each of the plurality of memory units.

According to the examples of the present disclosure, the neural processing unit may include a controller configured to execute a machine code configured to set the first to third domains in each of the plurality of memory units for each operation step of a plurality of operation steps of an artificial neural network model, each of the first to third domains set in consideration of a memory capacity of one of the plurality of memory units.

According to the examples of the present disclosure, the neural processing unit may include a controller configured to control the internal memory. The controller may be configured to reset the data of the third domain to the data of the first domain in a next operation step based on the machine code analyzing the data locality of the artificial neural network model as the same data locality.

According to the examples of the present disclosure, the first domain may be an input feature map, the second domain may be a weight, and the third domain may be an output feature map.

According to the examples of the present disclosure, the neural processing unit may include a controller configured to respectively control the first to third selectors for each subseAI calculationuent operation step so that an output feature map having the same data locality as an input feature map is reused in a next operation step.

According to the examples of the present disclosure, among the plurality of memory units include a first memory of the memory units configured as the first domain, a second memory group of memory units configured as the second domain, and a third memory group of the memory units configured as the third domain.

According to the examples of the present disclosure, the internal memory may includes a prefetch memory configured to store data freAI calculationuently reAI calculationuired for calculation of an artificial neural network model, the stored data including at least one of a fixed weight, an input feature map, and an output feature map, freAI calculationuently.

According to the examples of the present disclosure, a system may include: a main memory configured to store at least a portion of data of at least one artificial neural network model; and a neural processing unit comprising: a variable memory including a plurality of memory units, the variable memory configured to divide the portion of the data of the at least one artificial neural network model into a feature map and a weight, and to selectively store the feature map and the weight in a specific unit of the plurality of memory units; a direct memory access (DMA) circuit configured to control a memory operation between the main memory and the variable memory; and an AI calculation unit configured to receive the feature map and the weight from the variable memory and to process an artificial neural network inference operation.

According to the examples of the present disclosure, the neural processing unit may be configured to execute a machine code compiled to reduce redundant data communication of the feature map between the main memory and the variable memory based on at least one same data locality information of the at least one artificial neural network model.

According to the examples of the present disclosure, the variable memory is further configured to reuse the feature map by applying a machine code in which the at least one artificial neural network model is compiled, thereby power consumption of the system is relatively reduced compared to the prior art without feature map reuse.

According to the examples of the present disclosure, the variable memory is further configured to reuse the feature map by applying a machine code in which the at least one artificial neural network model is compiled, thereby inference operation processing time of the system is relatively reduced compared to the prior art without feature map reuse.

The examples illustrated in the specification and the drawings are merely provided to facilitate the description of the subject matter of the present disclosure and to provide specific examples to aid the understanding of the present disclosure and it is not intended to limit the scope of the present disclosure. It will be apparent to those of ordinary skill in the art to which the present disclosure pertains in which other modifications based on the technical spirit of the present disclosure can be implemented in addition to the examples disclosed herein.

National R&D Project Supporting This Invention

[Project Identification Number] 1711117009
[Task Number] 2020-0-01303-001
[Name of Ministry] Ministry of Science and ICT
[Name of Task Management (Specialized) Institution] Institute of Information &
Communications Technology Planning & Evaluation
[Research Project Title] Development of next-generation intelligent semiconductor technology (design) (R&D)
[Research Task Name] Development of high-bandwidth memory (HBM) interface technology for high-performance AI servers with HBM3 or higher grades.
[Contribution rate] 1/1
[Name of the organization performing the task] OPENEDGES Technology, Inc.
[Research Period] 2020.04.01~2022.12.31

What is claimed is:
1. A neural processing unit comprising:
an internal memory including a plurality of memory units;
a controller configured to control read and write operations of data of at least one of an input feature map domain, a weight domain, and an output feature map domain with respect to each of the plurality of memory units based on an operation schedule in a machine code in which a plurality of operation steps of an artificial neural network model are set a direct memory access (DMA) configured to read data from a main memory and to write input feature map data and weight data to the internal memory; and an artificial intelligence (AI) calculation unit configured to receive and operate the input feature map data and the weight data from the internal memory to generate output feature map data wherein the internal memory further includes a weight multiplexer, an input feature map multiplexer, and an output feature map demultiplexer, respectively connected to each of the plurality of memory units.

2. The neural processing unit of claim 1, wherein the machine code includes information on input feature map data, weight data, and output feature map data for the plurality of operation steps.

3. The neural processing unit of claim 1, wherein the machine code includes capacity information on input feature map data, capacity information on weight data, and capacity information on output feature map data for each of the plurality of operation steps of the artificial neural network model.

4. The neural processing unit of claim 1, wherein the machine code includes information on an operation step having the same data locality among the plurality of operation steps of the artificial neural network model.

5. The neural processing unit of claim 1, wherein the machine code includes operation order information of each of the plurality of operation steps of the artificial neural network model based on an artificial neural network data locality.

6. The neural processing unit of claim 1, further comprising:
at least one processing element configured to perform a convolution operation of input feature map data and weight data to generate output feature map data.

7. The neural processing unit of claim 1, further comprising:
first to third selectors configured to select each of the plurality of memory units based on the machine code; and
a processing element including a first input unit configured to receive input feature map data through the first selector, a second input unit configured to receive weight data through the second selector, and output unit configured to output feature map data through the third selector.

8. A neural processing unit comprising:
an internal memory including a plurality of memory units configured to store data of a first domain, a second domain, and a third domain, the plurality of memory units including a first memory unit storing the data of the first domain, a second memory unit storing the data of the second domain, and a third memory unit storing the data of the third domain;
a direct memory access (DMA) configured to read data from a main memory and to write the data of the first domain and weight data to the data of the second domain; and
an AI calculation unit including a first input unit configured to receive the data of the first domain, a second input unit configured to receive the data of the second domain, and an output unit configured to output the data of the third domain;
a first selector configured to connect the first memory unit to the first input unit;
a second selector configured to connect the second memory unit to the second input unit; and
a third selector configured to connect the third memory unit to the output unit.

9. The neural processing unit of claim 8, further comprising:
a controller configured to control the first to third selectors by a machine code that analyzes data locality of an artificial neural network model,
wherein the first selector is configured to input at least a portion of the data of the first domain to the AI calculation unit according to an operation order defined in the machine code,
wherein the second selector is configured to input at least a portion of the data of the second domain to the AI calculation unit according to the operation order defined in the machine code, and
wherein the third selector is configured to output at least a portion of the data of the third domain to at least one of the plurality of memory units according to the operation order defined in the machine code.

10. The neural processing unit of claim 8, further comprising:
a controller configured to execute a machine code configured to set the first to third domains in each of the plurality of memory units for each operation step of a plurality of operation steps of an artificial neural network model, each of the first to third domains set in consideration of a memory capacity of one of the plurality of memory units,
wherein each of the plurality of memory units is configured to have a predetermined memory capacity that is the same for each of the plurality of memory units or that is individually set for each of the plurality of memory units.

11. The neural processing unit of claim 8, further comprising:
a controller configured to control the internal memory,
wherein the controller is further configured to reset the data of the third domain to the data of the first domain in a next operation step based on the machine code analyzing the data locality of the artificial neural network model as the same data locality.

12. The neural processing unit of claim 8, further comprising:
a controller configured to respectively control the first to third selectors for each operation step of a plurality of operation steps so that an output feature map having the same data locality as an input feature map is reused in a next operation step of the plurality of operation steps,
wherein the first domain is an input feature map, the second domain is a weight, and the third domain is an output feature map.

13. The neural processing unit of claim 8, wherein the plurality of memory units include a first memory group of memory units configured as the first domain, a second memory group of memory units configured as the second domain, and a third memory group of memory units configured as the third domain.

14. The neural processing unit of claim 8, wherein the internal memory further includes a prefetch memory configured to store data frequently required for calculation of an artificial neural network model, the stored data including at least one of a fixed weight, an input feature map, and an output feature map.

15. A system comprising:
a main memory configured to store at least a portion of data of at least one artificial neural network model; and a neural processing unit comprising:
- a variable memory including a plurality of memory unit and at least one selectors connected to each of the plurality of memory unit and configured to select each of the plurality of memory units based on the at least one artificial neural network model, the variable memory configured to divide the portion of the data of the at least one artificial neural network model into a feature map and a weight and to selectively store the feature map and the weight in a specific unit of the plurality of memory units;
- a direct memory access (DMA) circuit configured to control a memory operation between the main memory and the variable memory; and
- an AI calculation unit configured to receive the feature map and the weight from the variable memory and to process an artificial neural network inference operation.

16. The system of claim 15, wherein the neural processing unit is configured to execute a machine code compiled to reduce redundant data communication of the feature map between the main memory and the variable memory based on at least one same data locality information of the at least one artificial neural network model.

17. The system of claim 15,
wherein the plurality of memory units include a first memory unit, a second memory unit, and a third memory unit,
wherein the variable memory is further configured to store data of a first domain in the first memory unit, to store data of a second domain in the second memory unit, and to store data of a third domain in the third memory unit, and
wherein the neural processing unit further comprises a controller configured to adjust a size of each domain of the variable memory based on a total capacity of the variable memory and structural data of the at least one artificial neural network model.

18. The system of claim 15, wherein the variable memory is further configured to reuse the feature map by applying a machine code in which the at least one artificial neural network model is compiled, thereby reducing at least one of a power consumption of the system and an inference operation processing time of the system.

* * * * *